(12) United States Patent
Noro

(10) Patent No.: US 9,811,872 B2
(45) Date of Patent: Nov. 7, 2017

(54) APPARATUS AND METHOD FOR GENERATING IMAGE DATA IN A REGION INCLUDING A PLURALITY OF PARTIAL REGIONS BASED ON SYNCHRONIZATION SIGNALS

(71) Applicant: FUJITSU LIMITED, Kawasaki-shi, Kanagawa (JP)

(72) Inventor: Masaaki Noro, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 150 days.

(21) Appl. No.: 14/860,875

(22) Filed: Sep. 22, 2015

(65) Prior Publication Data

US 2016/0150130 A1    May 26, 2016

(30) Foreign Application Priority Data

Nov. 20, 2014   (JP) .................................. 2014-235968

(51) Int. Cl.
*G06T 1/20* (2006.01)
*H04N 5/04* (2006.01)

(52) U.S. Cl.
CPC . *G06T 1/20* (2013.01); *H04N 5/04* (2013.01)

(58) Field of Classification Search
None
See application file for complete search history.

(56) References Cited

U.S. PATENT DOCUMENTS

2007/0139427 A1    6/2007   Sahashi

FOREIGN PATENT DOCUMENTS

JP    2007-164071    6/2007
JP    2011-13852     1/2011

*Primary Examiner* — Vu Nguyen
(74) *Attorney, Agent, or Firm* — Oblon, McClelland, Maier & Neustadt, L.L.P.

(57) ABSTRACT

An apparatus includes a first processor and a second processor, the first processor generates a first instruction, based on a first synchronization signal, the first instruction instructing that first partial image data regarding N partial regions of the plurality of partial regions are to be generated, the second processor generates the first partial image data based on the first instruction, the first processor is configured to determine a natural number M based on a time when the generation of the first partial image data is completed and a time when a second synchronization signal is generated, and generates, based on the second synchronization signal, a second instruction instructing that second image data regarding M partial regions of the plurality of partial regions are to be generated, and the second processor generates the second partial image data based on the second instruction.

14 Claims, 35 Drawing Sheets

FIG. 4

| | GPU | INTERNAL BUS | POWER CONSUMPTION | TRANSITION TIME TO ACTIVE MODE |
|---|---|---|---|---|
| ACTIVE MODE | ON | ON | HIGH ↕ | |
| STANDBY MODE | OFF (CLOCK STOP) | ON | | SHORT ↕ |
| SLEEP MODE | OFF (CLOCK STOP) | OFF (CLOCK STOP) | | |
| POWER OFF MODE | OFF (POWER STOP) | OFF (POWER STOP) | LOW | LONG |

FIG. 5

| FIRST PARTIAL REGION | SECOND PARTIAL REGION | THIRD PARTIAL REGION |
|---|---|---|
| FOURTH PARTIAL REGION | FIFTH PARTIAL REGION | SIXTH PARTIAL REGION |
| SEVENTH PARTIAL REGION | EIGHTH PARTIAL REGION | NINTH PARTIAL REGION |
| TENTH PARTIAL REGION | ELEVENTH PARTIAL REGION | TWELFTH PARTIAL REGION |

3a

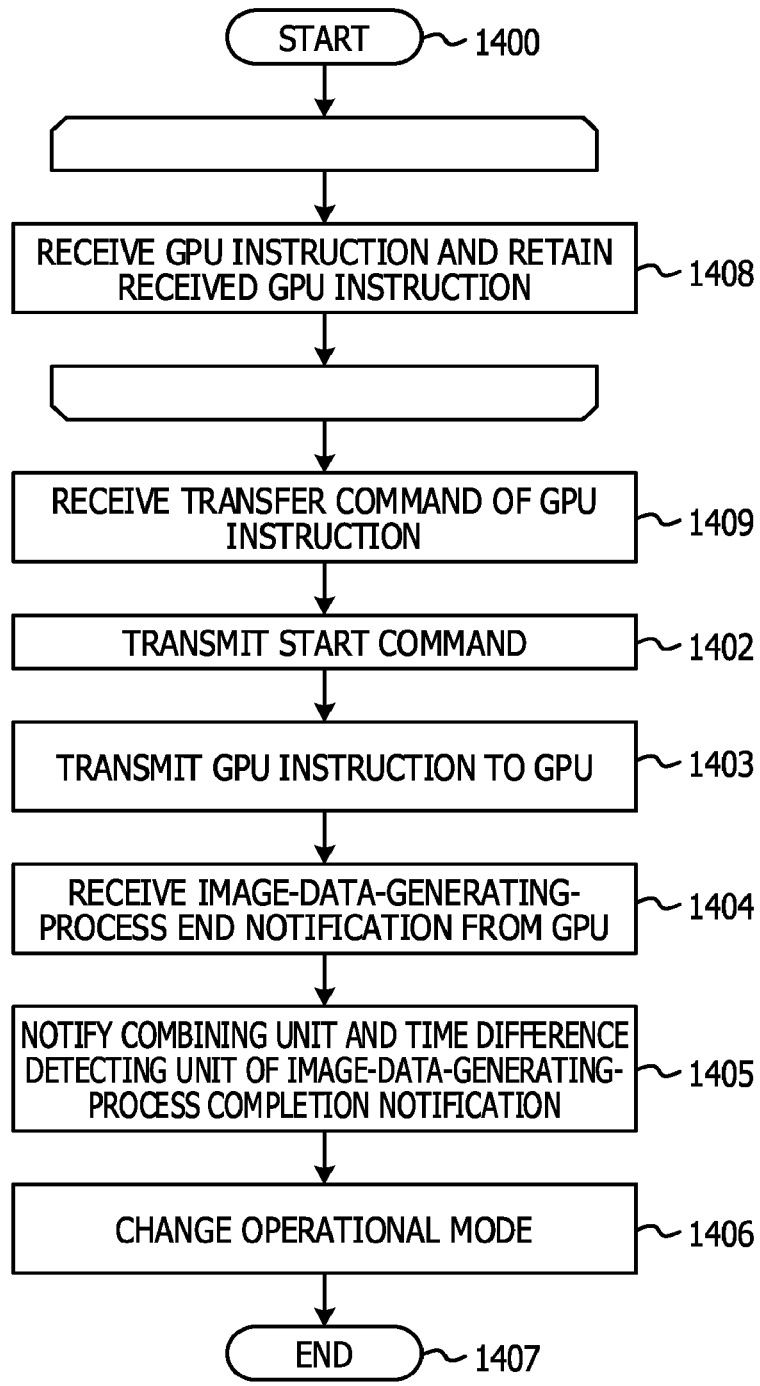

APPARATUS AND METHOD FOR GENERATING IMAGE DATA IN A REGION INCLUDING A PLURALITY OF PARTIAL REGIONS BASED ON SYNCHRONIZATION SIGNALS

CROSS-REFERENCE TO RELATED APPLICATION

This application is based upon and claims the benefit of priority of the prior Japanese Patent Application No. 2014-235968, filed on Nov. 20, 2014, the entire contents of which are incorporated herein by reference.

FIELD

The embodiments discussed herein are related to an image data generating method and an image data generating apparatus.

BACKGROUND

In a terminal apparatus such as a notebook computer or a smartphone, image data such as a moving image displayed on a display is updated in synchronization with a synchronization signal such as a vertical synchronization signal which is issued at a predetermined time interval. For example, when 60 synchronization signals are issued every second, a processor built in the terminal apparatus generates image data updated every $1/60$ seconds. However, when a process of generating the image data is not ended within a predetermined period of time defined as the interval of the synchronization signal, the smoothness in displaying the moving image on the display is impaired. In order to solve such a problem, a method in which an image region on which the image is displayed is divided into a plurality of partial regions, and an image data generating process is performed only for as many number of partial regions with which the image data generating process is ended within a predetermined period of time has been developed. In this method, even when it is difficult to end the image data generating process on all the image regions of the image region within the predetermined period of time, it is possible to generate the image data for a part of the image region within the predetermined period of time, and it is possible to display the generated image data on the display.

As a method of solving a problem caused by the fact that the image data generating process is not ended within the predetermined period of time, a technology in which an image region is divided into a plurality of partial regions, processors are assigned to the respective partial regions, and parallel processing is performed on the partial regions has been known. As related art, there is Japanese Laid-open Patent Publication No. 2011-13852.

SUMMARY

According to an aspect of the invention, an apparatus that generates image data regarding an image region including a plurality of partial regions based on synchronization signals generated at a predetermined time interval, the apparatus includes a memory, a first processor coupled to the memory, and a second processor coupled to the first processor, wherein the first processor is configured to generate a first instruction, based on a first synchronization signal, the first instruction instructing that first partial image data regarding N (N is a natural number) partial regions of the plurality of partial regions are to be generated, the second processor is configured to generate the first partial image data based on the first instruction, the first processor is configured to determine a natural number M based on a time when the generation of the first partial image data is completed and a time when a second synchronization signal which is subsequently issued to the first synchronization signal is generated, and is configured to generate, based on the second synchronization signal, a second instruction instructing that second image data regarding M partial regions of the plurality of partial regions are to be generated, and the second processor is configured to generate the second partial image data based on the second instruction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a relationship between a plurality of operational modes and power consumption;

FIG. 5 is a diagram illustrating an example in which a display region is divided into a plurality of partial regions;

FIG. 19 is a flowchart of a process of a driver according to the second modification example of the first embodiment;

DESCRIPTION OF EMBODIMENTS

In a method in which an image region is divided into a plurality of partial regions by a processor and image data items regarding some partial regions of the plurality of partial regions are generated, an image data generating process in another processor that generates image data that is actually displayed on a display is performed for each partial region in a temporally distributed manner. In this case, there is a problem that a time taken from the start of the image data generating process to the end thereof is lengthened.

First Embodiment

Figure 1:
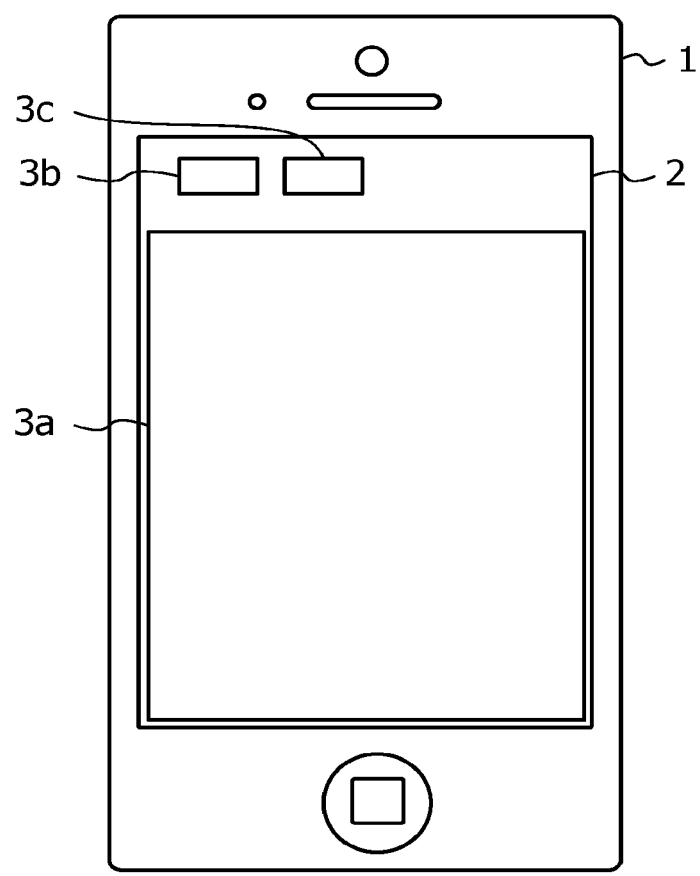
FIG. 1 is a diagram illustrating a configuration of a display apparatus.

In the present embodiment, a portable terminal apparatus such as a smartphone, a personal computer (PC) such as a notebook computer or a desktop computer, and a personal digital assistant (PDA) may be used as a display apparatus. FIG. 1 is a diagram illustrating a configuration of a portable terminal apparatus such as a smartphone as a display apparatus. A display 2 which is a display unit is provided in a display apparatus 1. When a plurality of application softwares (hereinafter, referred to as "applications") is executed on the display apparatus 1, an image generated by each application is displayed on the display 2. FIG. 1 illustrates a case where three applications executed in the display apparatus 1 respectively have display regions 3a, 3b and 3c in the display 2. The three applications are executed by a CPU 100, to be described below, which is provided in the display apparatus 1, and generate image data items to be displayed in the display regions 3a, 3b and 3c. The display apparatus 1 combines the image data items generated by the three applications, and generates image data to be displayed on the display 2. In the present specifications, it is assumed that the image data generated by each application is referred to as "image data", and the image data obtained by combining the image data items generated by the respective applications is referred to as "combined image data". The image displayed on the display 2 is updated based on a synchronization signal Vsync issued at a predetermined time interval. If 60 synchronization signals Vsync are issued every second, 60 images are sequentially updated on the display 2 every second.

Figure 2:
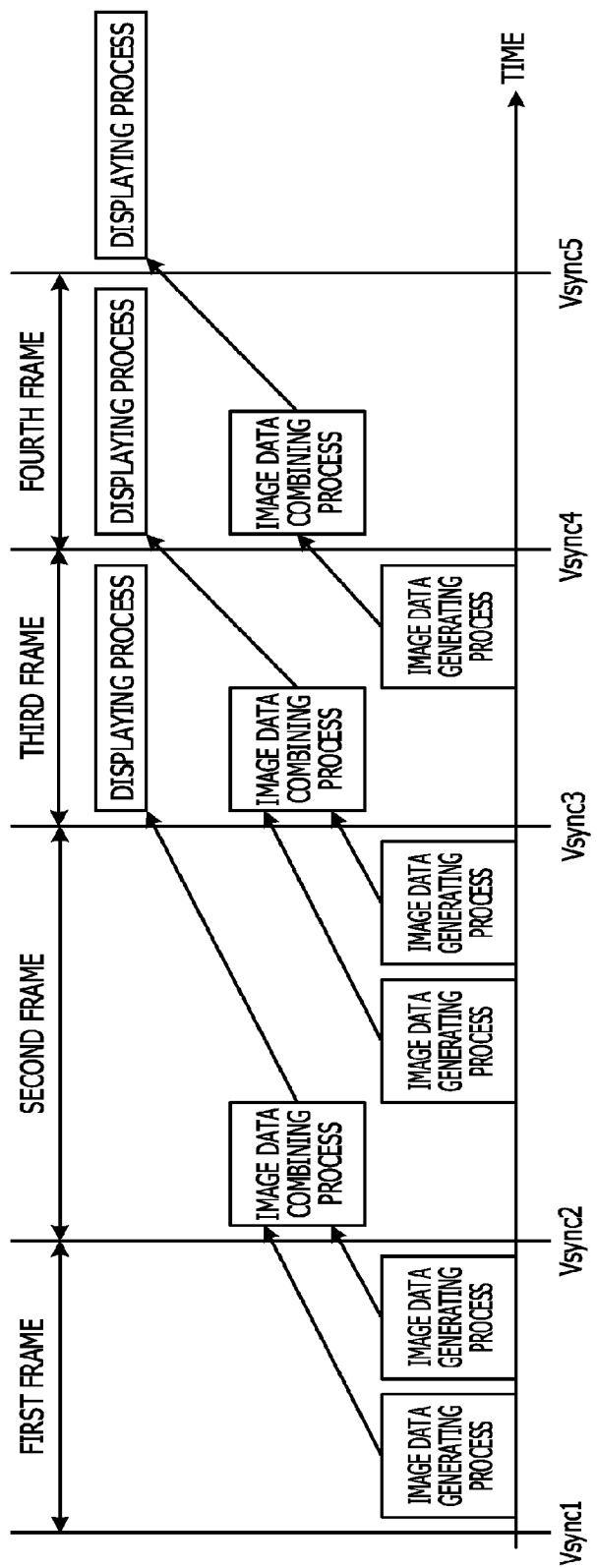
FIG. 2 is a diagram illustrating an example of a timing chart of an image data generating process, an image data combining process and a displaying process.

FIG. 2 is a diagram illustrating an example of a timing chart of an image data generating process performed for each application, an image data combining process of combining image data items generated by the image data generating process, and a displaying process of displaying combined image data generated by the image data combining process on the display 2. In FIG. 2, it is assumed that a horizontal axis represents a time. The image data generating process, the image data combining process and the displaying process are respectively performed based on the synchronization signal Vsync. In FIG. 2, for the sake of convenient illustration, an interval between the respective synchronization signals Vsync is not illustrated as an equal interval, but it is assumed that the synchronization signal Vsync is issued at a predetermined time interval. In the present specifications, it is assumed that a period of time between two synchronization signals Vsync that are consecutively issued is referred to as a "frame" and a period of time from the issuance of a synchronization signal Vsync1 to the issuance of a synchronization signal Vsync2 in FIG. 2 is referred to as a "first frame". Similarly, it is assumed hereinafter that a period of time from the issuance of the synchronization signal Vsync2 to the issuance of a synchronization signal Vsync3 is referred to as a "second frame", a period of time from the issuance of the synchronization signal Vsync3 to the issuance of a synchronization signal Vsync4 is referred to as a "third frame", and a period of time from the issuance of the synchronization signal Vsync4 to the issuance of a synchronization signal Vsync5 is referred to as a "fourth frame".

In the example illustrated in FIG. 2, the image data generating process is performed twice in the first frame. This means that two applications of the three applications described in FIG. 1, for example, two applications corresponding to the display region 3a and the display region 3b respectively perform the image data generating process in order to update the images displayed by the respective applications. It is assumed that the application corresponding to the display region 3c neither updates the image nor performs the image data generating process.

Subsequently, in the second frame, the image data combining process is performed on two image data items generated in the first frame. Thus, the combined image data to be displayed on the display 2 is generated. The combined image data generated in this frame is displayed on the display 2 in the third frame. After the image data combining process is performed in the second frame, the image data generating process is newly started. In the example of FIG. 2, the image data generating process is performed by two applications, the generated image data items are combined by the image data combining process in the third frame, and the combined image data is displayed on the display 2 in the fourth frame. As stated above, the image data generating process, the image data combining process and the displaying process are sequentially performed through a pipelining technique based on the synchronization signal Vsync. In FIG. 2, the image data generating process is performed only once in the third frame. As mentioned above, even when only one application generates the image data, the image data combining process is performed in the subsequent fourth frame, and a pipelining scheme is maintained.

Figure 3:
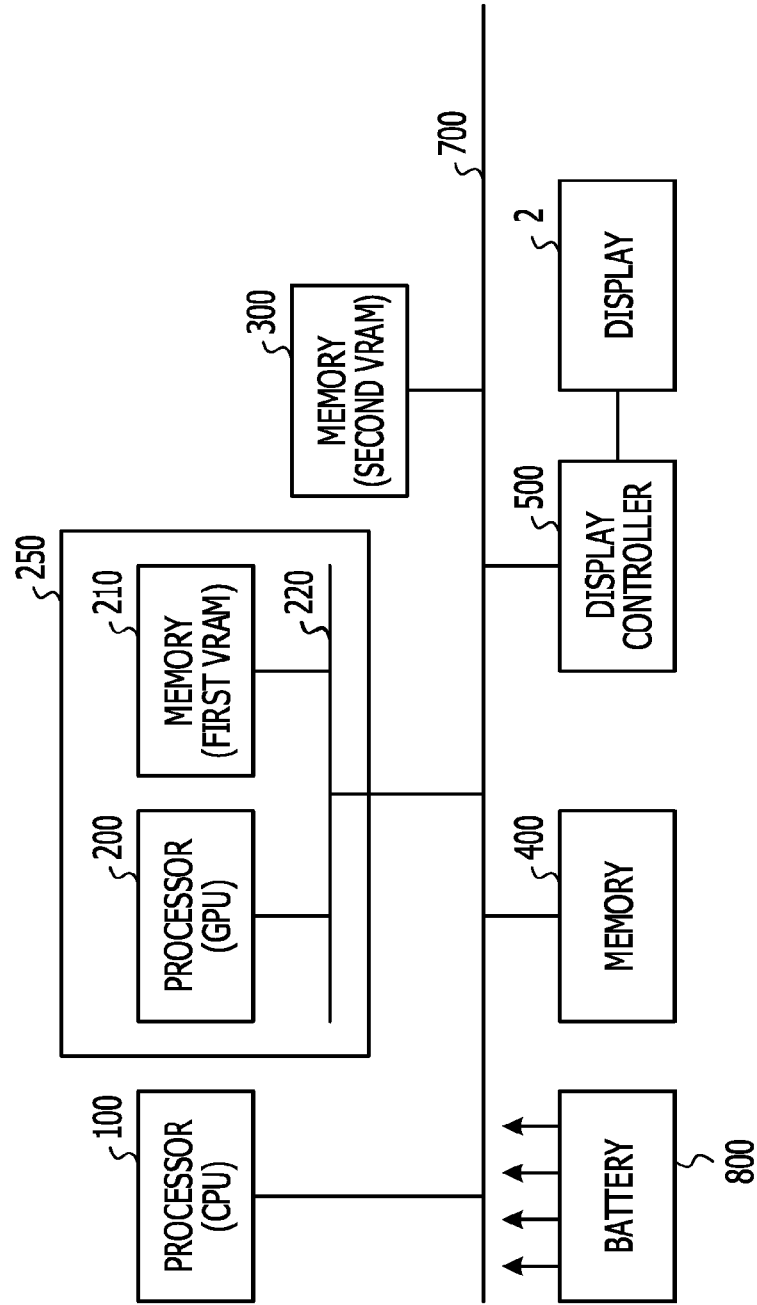
FIG. 3 is a hardware configuration diagram of the display apparatus.

FIG. 3 is a hardware configuration diagram of the display apparatus 1. The display apparatus 1 includes a processor 100, a processor 200, a memory 210, a bus 220, a memory 300, a memory 400, a display controller 500, a display 2, a bus 700, and a battery 800. The processor 100 manages the entire display apparatus 1 or performs data processing. The processor 100 generates image data regarding an image to be displayed on the display 2 using the processor 200 by executing computer programs such as applications stored in the memory 400 and the like. The processor 100 is an electronic circuit component such as a central processing unit (CPU), a micro processing unit (MPU), a digital signal processor (DSP), a field-programmable gate array (FPGA) and the like. The processor 200 generates the image data based on the instruction of the processor 100. When the plurality of applications is executed on the processor 100, the processor 200 generates the image data for each application, and stores the generated image data in the memory 210. The processor 200 is an electronic circuit component such as a CPU, an MPU, a DSP, an FPGA and the like, and is called a graphic processing unit (GPU) since this processor performs the image data generating process. In the following description of the present specification, for the sake of convenience in the description, the processor 100 is referred to as a "CPU 100", and the processor 200 is referred to as a "GPU 200".

The memory 210 is a memory that stores the image data generated by the GPU 200, and is called a video random access memory (VRAM). When the plurality of applications is executed on the CPU 100, the image data generated by the execution of each application is stored in the memory 210. The memory 300 is a memory that stores the combined image data obtained by combining the image data items generated for each application and stored in the memory 210. The memory 400 stores data used to perform a predetermined process by the CPU 100 or data which is a result of the process performed by the CPU 100 in addition to storing the computer programs such as the applications executed by the CPU 100. The memories 210, 300 and 400 are electronic circuit components such as a dynamic random access memory (DRAM), a static random access memory (SRAM) and the like. In the following description of the present specification, for the sake of convenience in the description, it is assumed that the memory 210 is referred to as a "first VRMA 210" and the memory 300 is referred to as a "second VRAM 300".

The display controller 500 displays the image on the display 2 based on the combined image data stored in the second VRAM 300. The function of the display controller 500 may be realized by the GPU 200. The bus 220 is a wire that couples the GPU 200 and the first VRAM 210. In the present specification, it is assumed that the GPU 200, the first VRAM 210 and the bus 220 are collectively referred to as an "image data generating unit 250". The bus 700 is a wire that couples the CPU 100, the image data generating unit 250, the second VRAM 300, the memory 400, and the display controller 500. In the following description of the present specification, for the sake of convenience in the description, it is assumed that the bus 220 is referred to as an "internal bus" and the bus 700 is referred to as a "bus". The battery 800 supplies a power to the respective devices within the display apparatus 1.

FIG. 4 is a diagram illustrating the relationship between a power consumed in the image data generating unit 250 and an operational mode of the image data generating unit 250 including the GPU 200 and the first VRAM 210. In the present embodiment, four modes are described as the operational mode. In an active mode, a power and a clock are supplied to the GPU 200 and the internal bus 220, and the image data generating process is performed. A standby mode is a state in which the power and the clock are supplied to the internal bus 220, whereas the power is supplied to the GPU 200 and the supply of the clock to this GPU is stopped. In this state, the GPU 200 does not perform the image data generating process, but when the supply of the clock is started, the GPU 200 can start the image data generating process. A sleep mode is a state in which the power is supplied to the GPU 200 and the internal bus 220, whereas the supply of the clock is stopped. In this state, the GPU 200 does not perform the image data generating process and is not able to access the first VRAM 210. In a power off mode, the supply of the power and the supply of the clock to the GPU 200 and the internal bus 220 are stopped.

The four operational modes illustrated in FIG. 4 are merely examples for describing a plurality of operational modes of which power consumption is different from one another, and the display apparatus 1 may not include all the operational modes illustrated in FIG. 4. The names of the respective operational modes are not intended to limit to the embodiment, but other names may be given to the respective operational modes.

Among the four operational modes illustrated in FIG. 4, the mode of which the power consumption in the image data generating unit 250 including the GPU 200 and the first VRAM 210 is the highest is the active mode in which the image data generating process is actually performed. Accordingly, in order to suppress the power consumption of the display apparatus 1, the image data generating unit 250 is preferably controlled in the standby mode, the sleep mode or the power off mode for a period of time during which the image data generating process using the GPU 200 is not performed.

Now, the fact that the image data generating unit 250 is preferably controlled in any one of the standby mode, the sleep mode and the power off mode for the period of time during which the image data generating process is not performed will be described. As illustrated in FIG. 4, the powers consumed in the respective modes are decreased in the order of the standby mode, the sleep mode and the power off mode. Meanwhile, times for transition to the active mode from these modes are increased in the order of the standby mode, the sleep mode and the power off mode. For this reason, when the period of time during which the image data generating process using the GPU 200 is not performed is a short period of time, it may be difficult to change the operational mode from the active mode to the sleep mode or the power off mode and to return the operational mode to the active mode for this short period of time. In such a case, the image data generating unit is preferably controlled in the standby mode of which the transition time to the active mode is shorter than the sleep mode or the power off mode. By contrast, when the period of time during which the image data generating process using the GPU 200 is not performed is equal to or longer than a predetermined period of time, the image data generating unit is preferably controlled in the sleep mode or the power off mode capable of controlling the power consumption rather than the standby mode.

Next, an image region dividing method will be described as a method of generating the image data. For example, when a moving image is displayed in the display region 3a illustrated in FIG. 1, the respective images that are consecutively displayed in the display region 3a are updated in synchronization with the synchronization signal Vsync. However, for example, when the image data amount of the image displayed in the display region 3a is large, the image data generating process displayed in the display region 3a may not be ended within the frame. In such a case, since it is difficult for the display apparatus 1 to perform the image data combining process and the displaying process based on the image data generating process, a series of processes are not performed at a predetermined timing, and thus, the smoothness of the image update is impaired.

In order to solve these problems, the image region dividing method is a method in which the display region 3a is divided into a plurality of partial regions, the image data generating process is sequentially performed for a predetermined number of partial regions with which the image data generating process can be completed for each frame, and the images are displayed in the partial regions for which the image data items are generated. In the next frame, the image data generating process is performed on the partial regions for which the image data items are not generated in the previous frame. FIG. 5 is a diagram illustrating an example in which the display region 3a is divided into the plurality of partial regions. In the example illustrated in FIG. 5, the display region 3a is divided into 12 partial regions. For example, some partial regions of the plurality of partial regions, for example, 6 partial-region image data items including a first partial region to a sixth partial region are generated in a certain frame, and the other partial regions of the plurality of partial regions, for example, 6 partial-region image data items including a seventh partial region to a twelfth partial region are generated in the next frame.

As stated above, it is possible to avoid a case in which the frame is ended when the image data generating process is not completed by performing the image data generating process in a range capable of completing this process within one frame.

Figure 6:
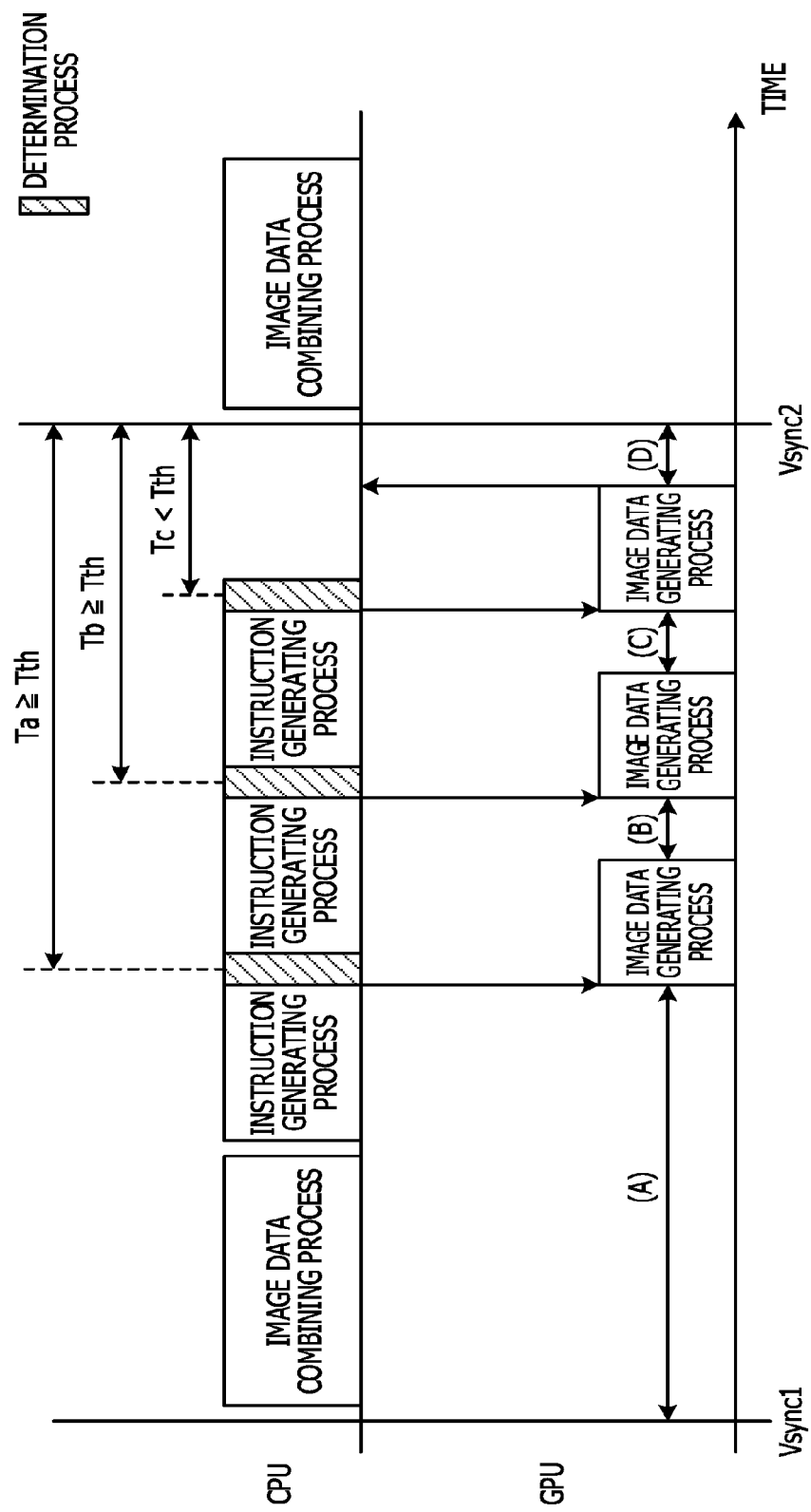
FIG. 6 is a diagram illustrating an example of a timing chart of processes of a CPU and a GPU.

FIG. 6 is a diagram illustrating an example of the relationship between the timing chart of the processes of the CPU 100 and the GPU 200 and the operational mode of the image data generating unit 250 in the image region dividing method. In FIG. 6, a horizontal axis represents a time, and the process timings of the CPU 100 and the GPU 200 in the first frame are primarily represented. Initially, the CPU 100 performs the image data combining process based on the synchronization signal Vsync1. Although not illustrated, the image data to be combined in the image data combining process is the image data in the one-previous frame of the first frame. It is assumed that the GPU 200 does not perform the image data generating process for the period of time during which the CPU 100 performs the image data combining process, and the image data generating unit 250 is controlled in the sleep mode in order to suppress the power consumption. When the image data combining process is ended, the CPU 100 starts the in an instruction generating process. Although three instruction generating processes are represented in the example illustrated in FIG. 6, this means that a process of generating an instruction is performed on three partial regions (here, it is assumed that the first partial region, the second partial region and the third partial region are used) of the partial regions illustrated in FIG. 5. The instruction is used to instruct the GPU 200 to generate the image data items regarding the images displayed in the respective partial regions. For example, instructions such as "generation of image data regarding a straight line connecting a coordinate (Xa, Ya) and a coordinate (Xb, Yb)" or "generation of image data regarding a triangle of which the vertices are a coordinate (Xc, Yc), a coordinate (Xd, Yd) and a coordinate (Xe, Ye) and internal color is black are generated. In FIG. 6, initially, when an instruction regarding the first partial region is generated, the CPU 100 transmits the generated instruction to the GPU 200. Although not illustrated in FIG. 6, before the instruction generated by the CPU 100 is transmitted to the GPU 200, the instruction is converted into a GPU instruction that can be decrypted by the GPU 200. The conversion of the instruction into the GPU instruction will be described below with reference to FIG. 9. The image data generating unit 250 switches the operational mode from the sleep mode to the active mode, and the GPU 200 receives the GPU instruction. The GPU 200 generates first partial-region image data items in response to the content of the GPU instruction. The GPU 200 stores the generated image data in the first VRAM 210. When the image data generating process of the GPU 200 is ended, the image data generating unit 250 suppresses the power, and performs transition to the standby mode so as to start the image data generating process in a short period of time when the next GPU instruction is received.

Meanwhile, after the instruction regarding the first partial region is generated, the CPU 100 performs a determination process of determining whether or not a remaining time Ta of the first frame is longer than a predetermined value Tth. Here, since the remaining time Ta of the first frame is longer than the predetermined value Tth, the CPU 100 generates an instruction regarding the second partial region as another partial region, and transmits a GPU instruction to the GPU 200. After the instruction regarding the second partial region is generated, the CPU 100 performs a determination process of whether or not a remaining time Tb of the first frame is longer than the predetermined value Tth. Here, since the remaining time Tb of the first frame is longer than the predetermined time Tth, the CPU 100 generates an instruction regarding the third partial region as another partial region. In a determination process at a timing when the generation of the instruction regarding the third partial region is ended, it is determined that a remaining time Tc of the first frame is shorter than the predetermined value Tth. In this case, when an additional instruction is generated within the first frame, there is a possibility that the image data generating process using the GPU 200 will not be ended at a timing when the first frame is ended. Thus, the CPU 100 determines that the instruction generating process is not additionally performed on another partial region. After the GPU 200 generates the image data in response to the GPU instruction regarding the third partial region, since the image data generating process is not additionally performed within the first frame, the operational mode of the image data generating unit 250 is switched to the sleep mode. The image data items regarding the three partial regions generated in the first frame are combined in the second frame. When the image data generating process on the three partial regions is ended, the GPU 200 transmits an end notification to the CPU 100.

In FIG. 6, the image data generating unit 250 is controlled in the sleep mode for a period of time (period of time A) until the image data generating process on the first partial region is started. Meanwhile, the image data generating unit 250 is controlled in the standby mode in preparation for the image data generating process on the next partial region for periods of time during the image data generating process on the respective partial regions (a period of time B and a period of time C). As described in FIG. 4, in order to suppress the power consumption, the image data generating unit 250 is preferably controlled in the sleep mode rather than the standby mode. Thus, a method of increasing the period of time A during which the image data generating unit 250 is controlled in the sleep mode by reducing the period of time B and the period of time C during which the image data generating unit 250 is controlled in the standby mode will be described below.

Figure 7:
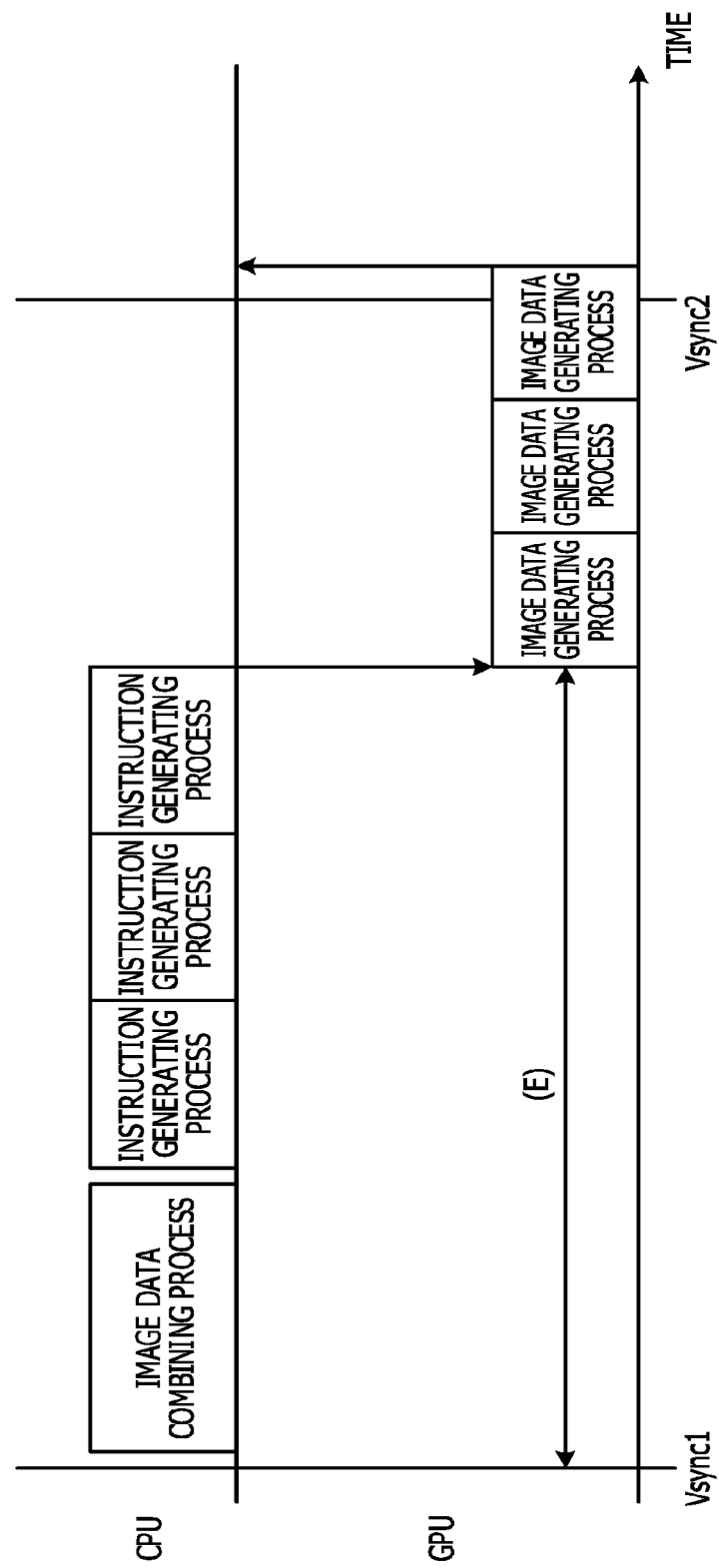
FIG. 7 is a diagram illustrating an example of a timing chart of the processes of a CPU and a GPU according to a first embodiment.

FIG. 7 is a diagram for describing the method of increasing the period of time during which the image data generating unit 250 is controlled in the sleep mode. In FIG. 7, a horizontal axis represents a time, and the process timings of the CPU 100 and the GPU 200 in the first frame are primarily illustrated. After the image data combining process is performed based on the synchronization signal Vsync1, the CPU 100 generates instructions regarding the plurality of partial regions, that is, three partial regions in the example of FIG. 7, and retains the generated instructions, and transmits the retained GPU instructions regarding the plurality of partial regions to the GPU 200 after the instruction generating process on the plurality of partial regions is ended. In other words, the CPU 100 does not transmit the GPU instruction to the GPU 200 whenever the instruction regarding one partial region is generated, and transmits the GPU instructions to the GPU 200 all at once after the instruction generating process on the plurality of regions is ended. The GPU 200 receives the GPU instructions from the CPU 100 to start the image data generating process, and generates the image data items regarding the plurality of partial regions.

In this method, it is possible to reduce the interval periods of time (the period of time B and the period of time C in FIG. 6) of the image data generating process on the plurality of partial regions, and a period of time E illustrated in FIG. 7 can be longer than the period of time A illustrated in FIG. 6. Thus, it is possible to suppress the power consumption by controlling the image data generating unit 250 in the sleep mode for the period of time E. Although it has been described in the preset embodiment that the image data generating unit 250 is controlled in the sleep mode for a period of time until the GPU 200 starts the image data generating process, the image data generating unit 250 may be controlled in another operational mode of which the power consumption is lower than that of the standby mode, for example, the power off mode.

Next, a method of determining the number of partial regions to be processed in each frame will be described. The number of partial regions for which the instruction is generated in each frame, that is, the number of partial regions for which the image data is generated so as to correspond to each frame is set through feedback control based on the result of the image data generating process in the previous frame of each frame. For example, in FIG. 7, the CPU 100 generates instructions regarding three partial regions, and the GPU 200 performs the image data generating process on the three partial regions. However, in the example illustrated in FIG. 7, the image data generating process on the three partial regions using the GPU 200 is not completed for the period of time of the first frame, and the image data generating process is completed after the second frame is started. This can be determined by an issuing timing of the synchronization signal Vsync2 which is a start timing of the second frame and an issuing timing of the end notification for notifying the CPU 100 that the GPU 200 ends the image data generating process. When the image data generating process using the GPU 200 is not ended at a timing when the synchronization signal Vsync2 is issued, since the storing of the image data to be subject to the combining process in the first VRAM 210 is not completed, the image data combining process using a combining unit 170 is not performed. For this reason, the smoothness of the image displayed on the display 2 is impaired.

Figure 8:
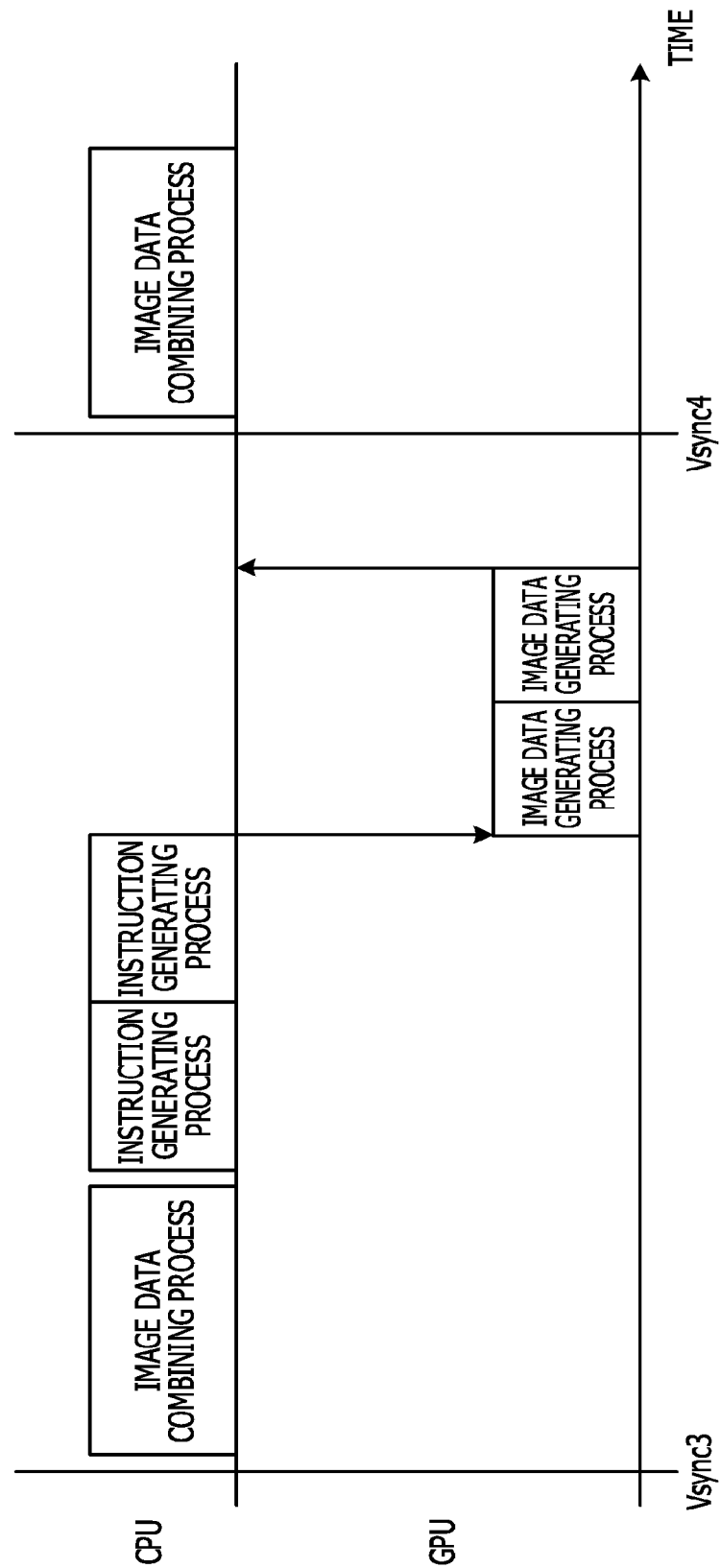
FIG. 8 is a diagram illustrating an example of the timing chart of the processes of the CPU and the GPU according to the first embodiment.

In order to solve such problems, when the image data generating process within the frame is not completed, the CPU 100 reduces the number of partial regions for which the instruction is generated in the next frame. In FIG. 7, an example in which the image data generating process is performed on the three partial regions in the first frame and the image data generating process is not ended in the first frame is illustrated. FIG. 8 is a diagram that primarily illustrates an example of the process timings of the CPU 100 and the GPU 200 in the third frame when the number of partial regions for which the instruction is generated is reduced up to two. The CPU 100 sets the number of partial regions for which the instruction is generated to be two in the third frame, ends the generation of the instruction at a timing when the instructions regarding the two partial regions are generated, and transmits the GPU instructions to the GPU 200. It can be seen that at a timing when the GPU 200 ends the generation of the image data regarding the two partial regions, the synchronization signal Vsync4 indicating the start of the fourth frame is still not issued, and the image data generating process can be completed within the third frame. In this case, in the fourth frame, the image data combining process is performed on the image data generated in third frame.

As mentioned above, the CPU 100 generates the instructions regarding the plurality of partial regions in a certain frame, and controls the number of partial regions for which the instruction is generated in the next frame based on the determination of whether or not the image data generating process on the plurality of partial regions is completed in the frame.

Figure 9:
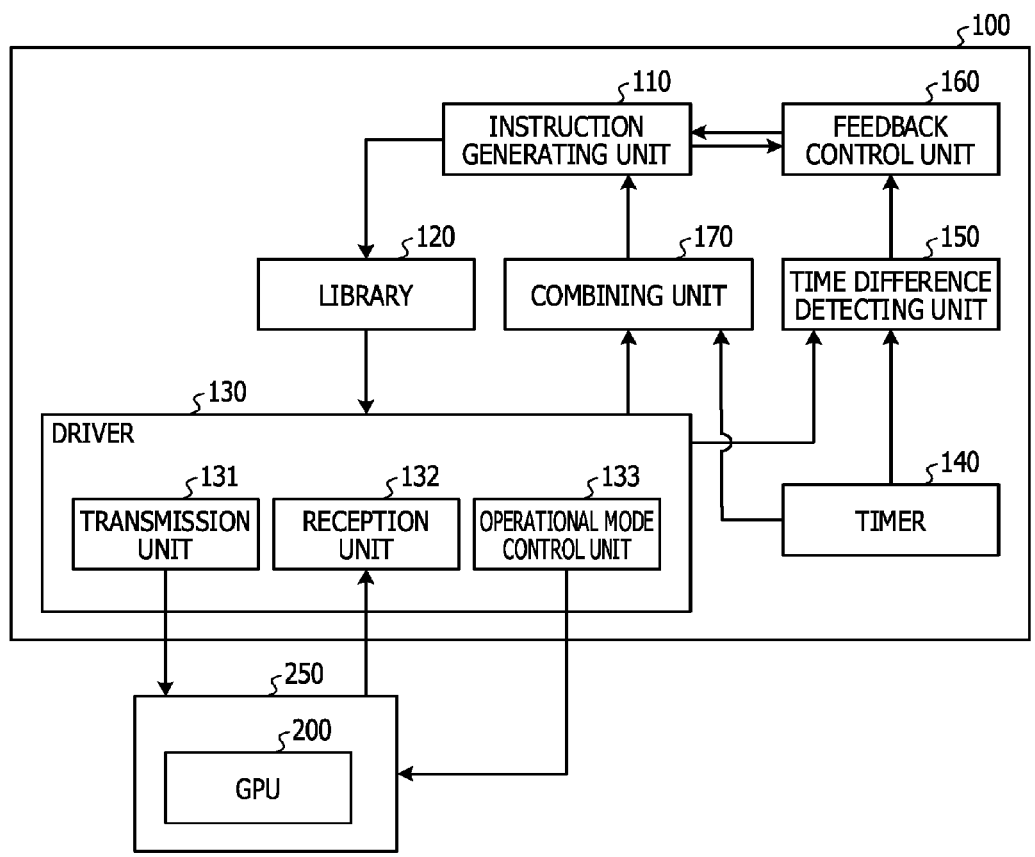
FIG. 9 is a functional block diagram of the CPU according to the first embodiment.

FIG. 9 is a functional block diagram of the CPU 100 according to the first embodiment. The CPU 100 realizes the respective functions illustrated in FIG. 9 by executing a predetermined computer program stored in the memory 400 or another storage device that can be accessed by the CPU 100. The CPU 100 functions as an instruction generating unit 110, a library 120, a driver 130, a timer 140, a time difference detecting unit 150, a feedback control unit 160, and the combining unit 170.

The instruction generating unit 110 is notified of the number of partial regions for which the instruction is generated in each frame from the feedback control unit 160, generates the instructions regarding the partial regions corresponding to the notified number, and transmits the generated instructions to the library 120. The instruction generating unit 110 starts the instruction generating process after a start command of the instruction generating process is received from the combining unit 170. The instruction generating unit 110 notifies the combining unit 170 of the number of partial regions for which the instruction is generated in one frame. The instruction generating unit 110 is realized by, for example, an application layer.

The library 120 generates the GPU instructions based on the instructions generated by the instruction generating unit 110. The GPU 200 is difficult to recognize the instructions in the application layer level which are generated by the instruction generating unit 110. For this reason, the library 120 converts the instruction generated by the instruction generating unit 110 into the GPU instruction that can be recognized by the GPU 200. The library 120 transmits the generated GPU instruction to the driver 130. The library 120 is realized by, for example, a middle layer, but may be realized by the application layer or an operating system (OS) layer.

The driver 130 functions as a transmission unit 131, a reception unit 132, and an operational mode control unit 133. The transmission unit 131 transmits the GPU instruction received from the library 120 to the GPU 200. The transmission unit 131 may include a buffer that temporarily stores the GPU instruction, and may transmit the GPU instruction stored in the buffer to the GPU 200 over multiple times. The reception unit 132 receives an end notification indicating that the image data generating process is ended based on the GPU instruction from the GPU 200. The reception unit 132 transmits a completion notification indicating that all the image data generating processes in the frame are completed based on the received end notification to the time difference detecting unit 150 and the combining unit 170. The operational mode control unit 133 controls the operational mode of the image data generating unit 250. For example, the operational mode control unit controls the image data generating unit 250 in the active mode when the GPU 200 generates the image data based on the instruction transmitted from the transmission unit 131, and controls the image data generating unit 250 in the sleep mode after the whole image data generating process is ended. For example, the driver 130 is realized by the OS layer.

The timer 140 generates the synchronization signal Vsync at a predetermined time interval, and transmits the generated synchronization signal to the time difference detecting unit 150 and the combining unit 170. The time difference detecting unit 150 transmits a time difference signal to the feedback control unit 160 based on the completion notification received from the reception unit 132 of the driver 130 and the synchronization signal Vsync received from the timer 140. The time difference signal includes at least one of time difference information indicating a difference between a time when the time difference detecting unit 150 receives the completion notification and a time when the time difference detecting unit receives the synchronization signal Vsync, and order information indicating the order in which the time difference detecting unit 150 receives the completion notification and the synchronization signal Vsync. For example, the timer 140 and the time difference detecting unit 150 are realized by the OS layer.

The feedback control unit 160 sets the number partial regions for which the instruction will be generated in the next frame based on the time difference signal received from the time difference detecting unit 150, and notifies the instruction generating unit 110 of the set number. When the synchronization signal Vsync is received from the timer 140 after the completion notification is received from the reception unit 132 of the driver 130, the combining unit 170 performs the image data combining process based on the image data stored in the first VRAM 210, and stores the generated combined image data in the second VRAM 300.

The combining unit 170 transmits the start command of the instruction generating process to the instruction generating unit 110 after the image data combining process is ended. The feedback control unit 160 and the combining unit 170 are realized by, for example, the middle layer, but may be realized by the application layer or the OS layer.

Figure 10:
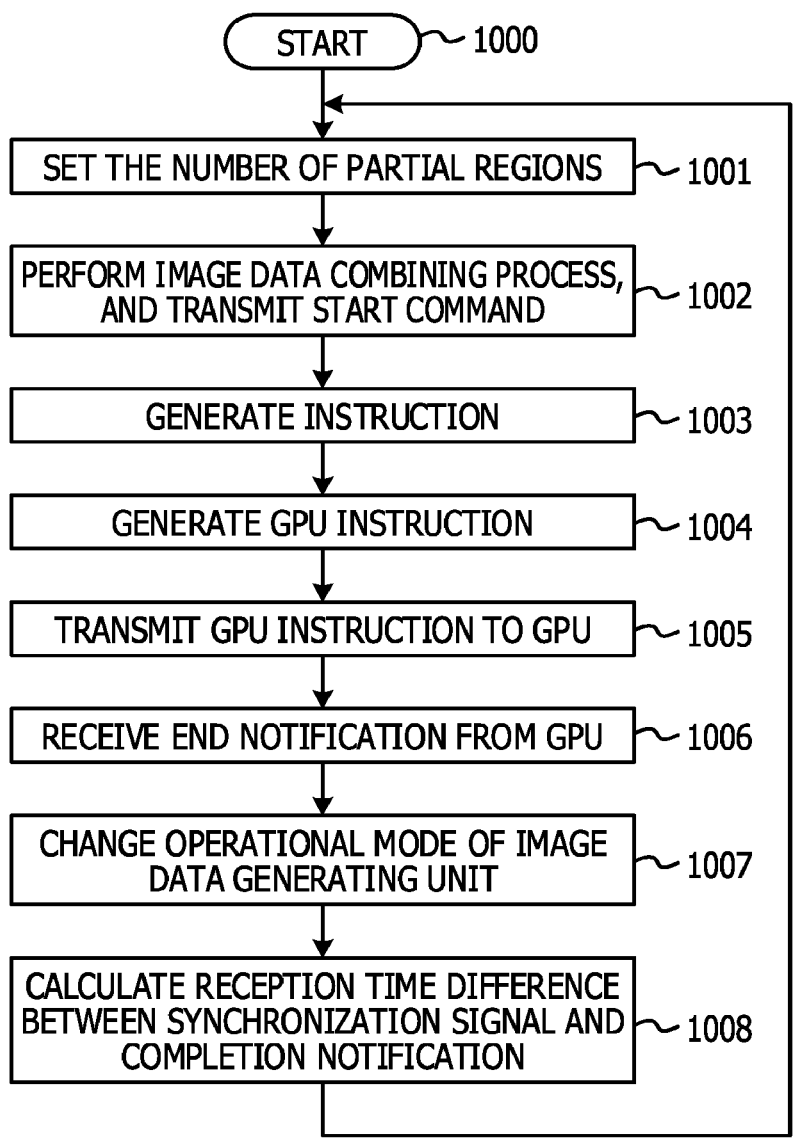
FIG. 10 is a flowchart of a process of the CPU according to the first embodiment.

FIG. 10 is a flowchart of the instruction generating process performed by the CPU 100 according to the first embodiment. The process performed by the CPU 100 is started from Process 1000. In Process 1001, the feedback control unit 160 sets the number of partial regions to be subjected to the instruction generating process, and notifies the instruction generating unit 110 of the set number of partial regions. A method of setting the number of partial regions performed by the feedback control unit 160 will be described in detail below. In Process 1002, the combining unit 170 performs the image data combining process based on the image data stored in the first VRAM 210, and transmits the start command of the instruction generating process to the instruction generating unit 110 after the image data combining process is ended. The combined image data generated in Process 1002 is stored in the second VRAM 300. In Process 1003, the instruction generating unit 110 starts the instruction generating process based on the start command of the instruction generating process received from the combining unit 170. Here, the instruction generating unit 110 generates the instructions regarding the partial regions corresponding to the number of the partial region set by the feedback control unit 160. In Process 1004, the library 120 generates the GPU instructions based on the instructions generated by the instruction generating unit 110, and transmits the generated GPU instructions to the driver 130. In Process 1005, the driver 130 transmits the GPU instructions to the GPU 200 through the transmission unit 131. In Process 1006, the driver 130 receives the end notification of the image data generating process from the GPU 200 by the reception unit 132, and transmits a completion notification indicating that the image data generating process in the frame is completed to the combining unit 170 and the time difference detecting unit 150. In Process 1007, the driver 130 changes the operational mode of the image data generating unit 250 to the sleep mode by using the operational mode control unit 133. In Process 1008, the time difference detecting unit 150 generates the time difference signal based on a reception time of the synchronization signal Vsync and a reception time of the completion notification, and transmits the generated time difference signal to the feedback control unit 160. Subsequently, the process returns to Process 1001, and the feedback control unit 160 sets the number of partial regions to be subjected to the instruction generating process based on the time difference signal.

Figure 11:
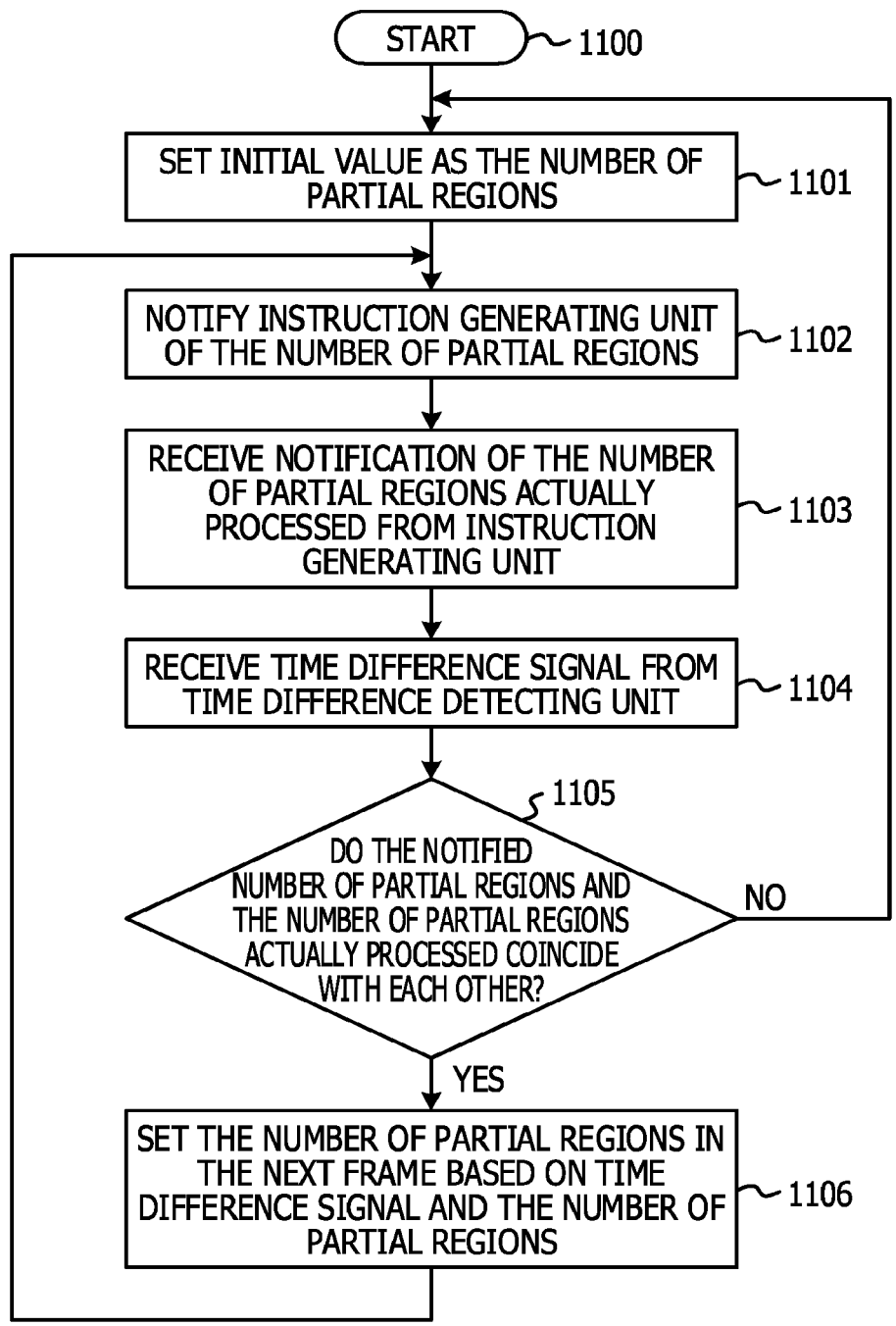
FIG. 11 is a flowchart of a process of a feedback control unit according to the first embodiment.

FIG. 11 is a flowchart of a process of setting the number of partial regions to be subjected to the instruction generating process, which is performed by the feedback control unit 160 according to the first embodiment.

The process performed by the feedback control unit 160 is started from Process 1100. In Process 1101, the feedback control unit 160 sets an initial value as the number of partial regions to be subjected to the instruction generating process. When the feedback control unit 160 sets the number of partial regions, this initial value is a value when the time difference signal from the time difference detecting unit 150 is not received, for example, when the image data generating process is not performed on the previous frame. The initial value is, for example, 1. In Process 1102, the feedback control unit 160 notifies the instruction generating unit 110 of the set number of partial regions. In Process 1103, the feedback control unit 160 is notified of the number of partial regions on which the instruction generating process is actually performed by the instruction generating unit 110. For example, the instruction generating unit 110 generates the instructions regarding as many partial regions as the number smaller than the number of partial regions set by the feedback control unit 160, and ends the process in some cases. By taking such a case into consideration, the feedback control unit 160 receives information regarding the number of partial regions on which the instruction generating process is actually performed from the instruction generating unit 110. In Process 1104, the feedback control unit 160 receives the time difference signal from the time difference detecting unit 150. In Process 1105, the feedback control unit 160 determines whether or not the set number of partial regions and the number of partial regions for which the instruction is actually generated by the instruction generating unit 110 coincide with each other. When the set number of partial regions and the number of partial regions for which the instruction is actually generated do not coincide with each other, that is, when the number of partial regions for which the instruction is actually generated is smaller than the set number of partial regions, the process returns to Process 1101. In Process 1106, when the set number of partial regions and the number of partial regions for which the instruction is actually generated coincide with each other, the feedback control unit 160 sets the number of partial region for which the instruction is generated in the next frame based on the time difference signal and the set number of partial regions, and the process returns to Process 1102.

Figure 12:
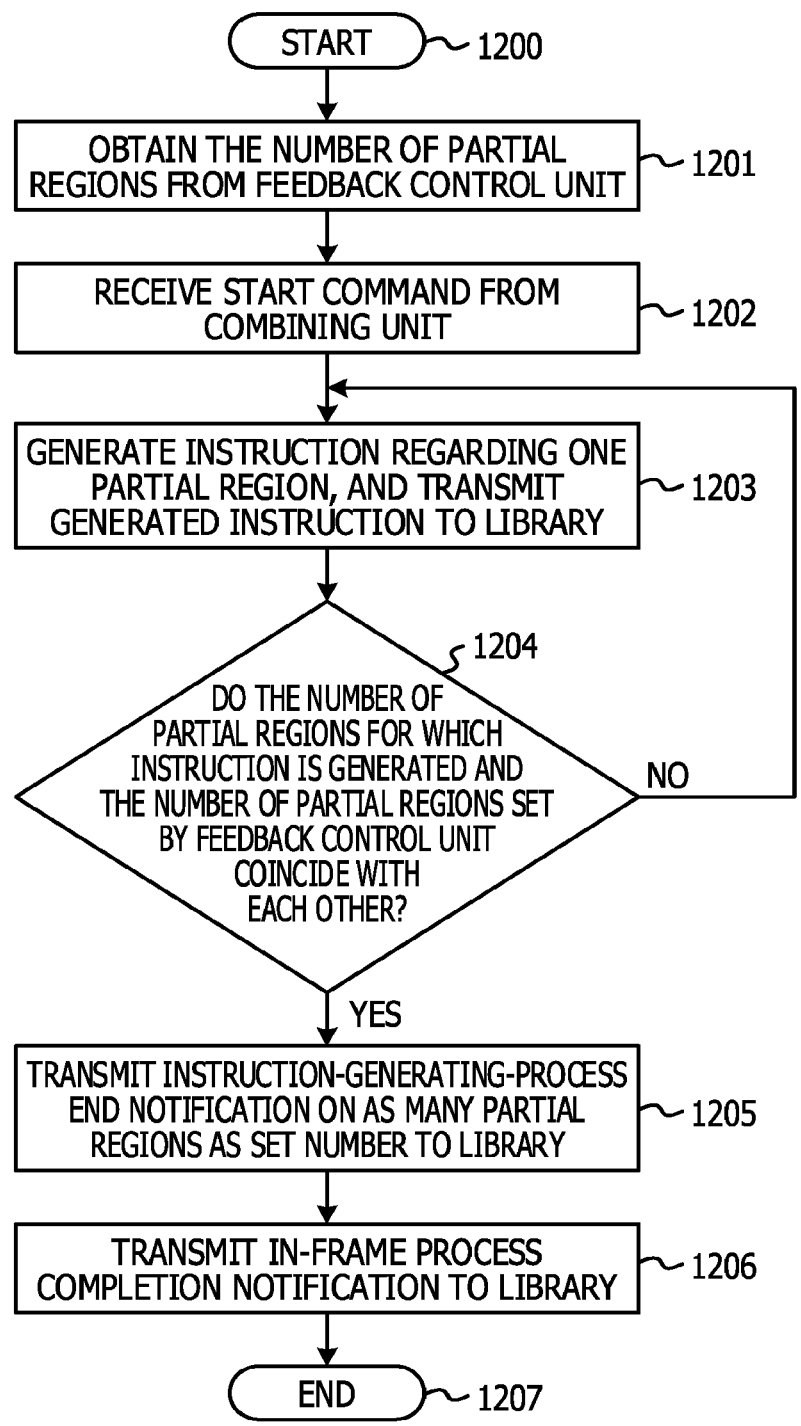
FIG. 12 is a flowchart of a process of an instruction generating unit according to the first embodiment.

FIG. 12 is a flowchart of the instruction generating process performed by the instruction generating unit 110 according to the first embodiment. The process performed by the instruction generating unit 110 is started from Process 1200. In Process 1201, the instruction generating unit 110 obtains the set number of partial regions from the feedback control unit 160. In Process 1202, the instruction generating unit 110 receives the start command of the instruction generating process from the combining unit 170. In Process 1203, the instruction generating unit 110 generates the instruction regarding one partial region, and transmits the generated instruction to the library 120. In Process 1204, the instruction generating unit 110 determines whether or not the number of partial regions for which the instruction is generated coincides with the number of partial regions set by the feedback control unit 160. When it is determined that the number of partial regions for which the instruction is generated coincides with the number of partial regions set by the feedback control unit 160, the process proceeds to Process 1205, and when it is determined that these numbers do not coincide with each other, the process returns to Process 1203. In Process 1205, the instruction generating unit 110 transmits an instruction-generating-process end notification indicating that the instruction generating process is performed on as many partial regions as the number set by the feedback control unit 160, to the library 120. In Process 1206, the instruction generating unit 110 transmits an in-frame process end notification indicating that all the processes in the frame are ended and another process is not performed in the frame to the library 120, and the process is ended in Process 1207.

Figure 13:
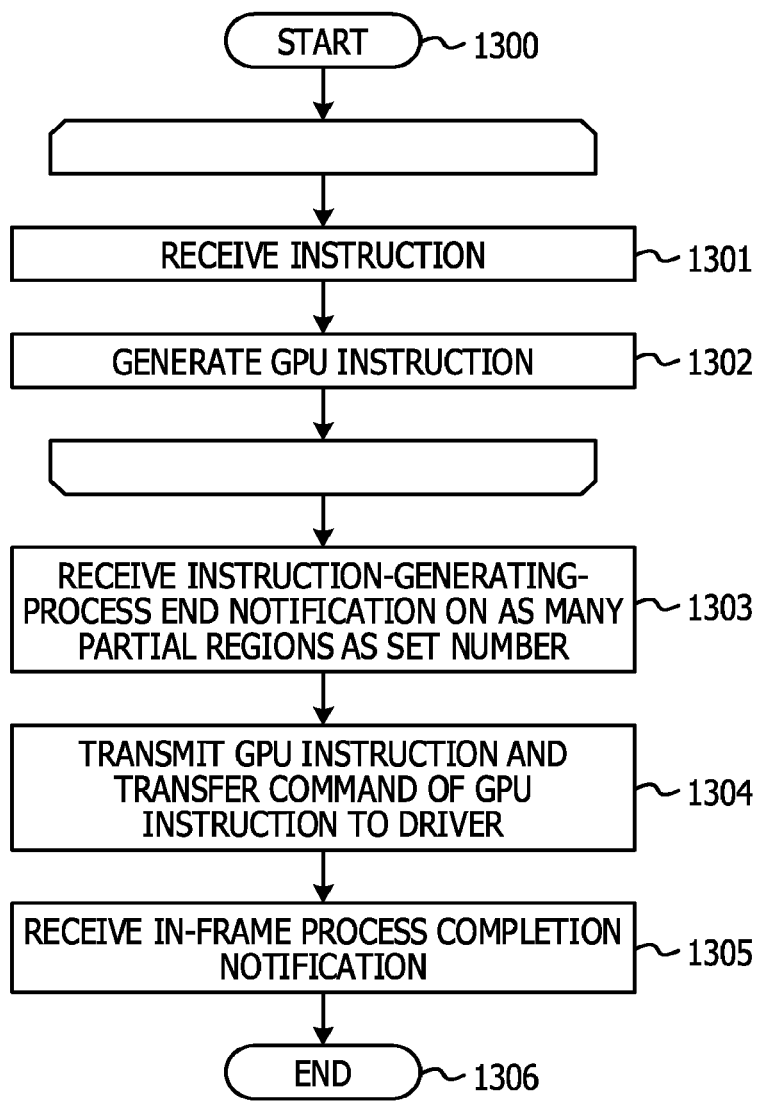
FIG. 13 is a flowchart of a process of a library according to the first embodiment.

FIG. 13 is a flowchart of a GPU instruction generating process performed by the library 120 according to the first embodiment. The process performed by the library 120 is started from Process 1300. In Process 1301, the library 120 receives the instruction from the instruction generating unit 110. In Process 1302, the library 120 generates the GPU instruction based on the received instruction. The generated GPU instruction is retained by the library 120. In Process 1303, the library 120 receives the instruction-generating-process end notification from the instruction generating unit 110. The library 120 can recognize that the instruction generating process on as many partial regions as the number set by the feedback control unit 160 is ended by receiving the instruction-generating-process end notification. In Process 1304, the library 120 transmits the GPU instruction to the driver 130, and transmits a transfer command of the GPU instruction to the GPU 200 to the driver 130. In Process 1305, the library 120 receives the in-frame process end notification from the instruction generating unit 110, and ends the process in Process 1306.

As stated above, the library 120 retains the generated GPU instruction until the end notification indicating that the instruction generating process on as many partial regions as the number set by the feedback control unit 160 is ended. In other words, the generated GPU instruction is not transmitted to the driver 130, and the GPU 200 does not start the image data generating process until the instruction generating process on as many partial regions as the number set by the feedback control unit 160 is completed.

Figure 14:
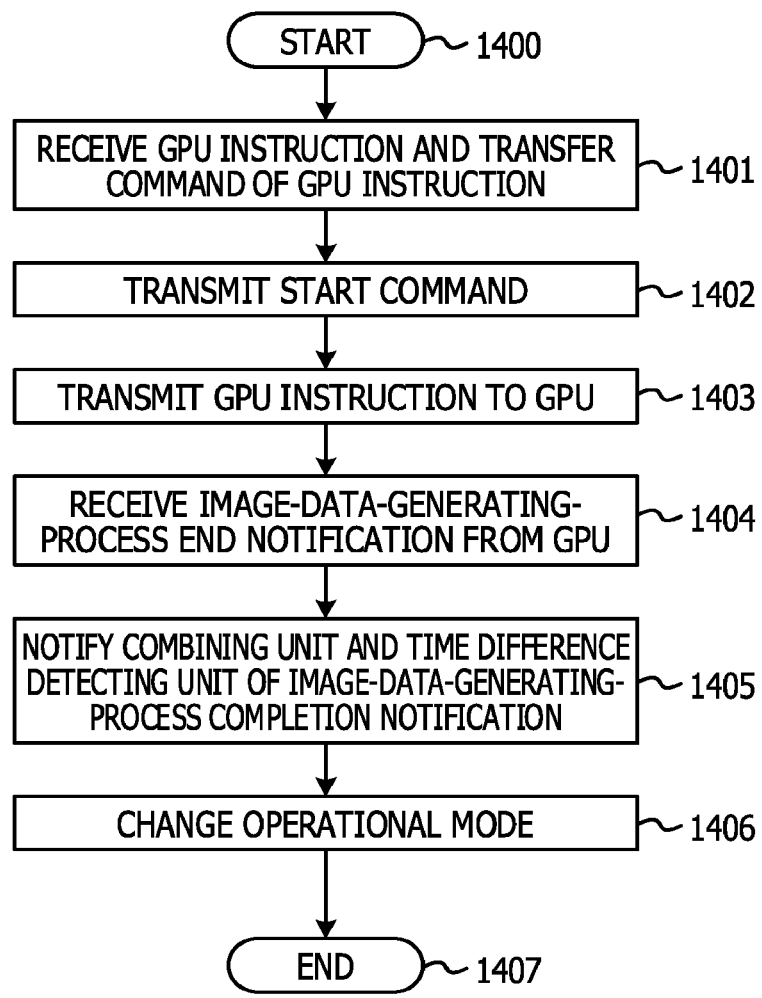
FIG. 14 is a flowchart of a process of a driver according to the first embodiment.

FIG. 14 is a flowchart of a GPU instruction transmitting process performed by the driver 130 according to the first embodiment. The process performed by the driver 130 is started from Process 1400. In Process 1401, the driver 130 receives the GPU instruction and the transfer command of the GPU instruction to the GPU 200 from the library 120. In Process 1402, the operational mode control unit 133 transmits a start command to the image data generating unit 250. The image data generating unit 250 starts the operation in the active mode due to the start command. In Process 1403, the transmission unit 131 transmits the GPU instruction to the GPU 200. In this case, when it is difficult to store all the GPU instructions in a data buffer included in the GPU 200, the transmission unit 131 may transmit the GPU instructions to the GPU 200 according to the capacity of the data buffer of the GPU 200 over multiple times. In Process 1404, the reception unit 132 receives an image-data-generating-process end notification from the GPU 200. In Process 1405, the driver 130 transmits the remaining GPU instructions to the GPU 200 when there are the GPU instructions that are still not transmitted to the GPU 200, and transmits an image-data-generating-process completion notification to the combining unit 170 and the time difference detecting unit 150 when there are no remaining GPU instructions. In Process 1406, the operational mode control unit 133 changes the operational mode of the image data generating unit 250 to the sleep mode, and ends the process in Process 1407.

Figure 15:
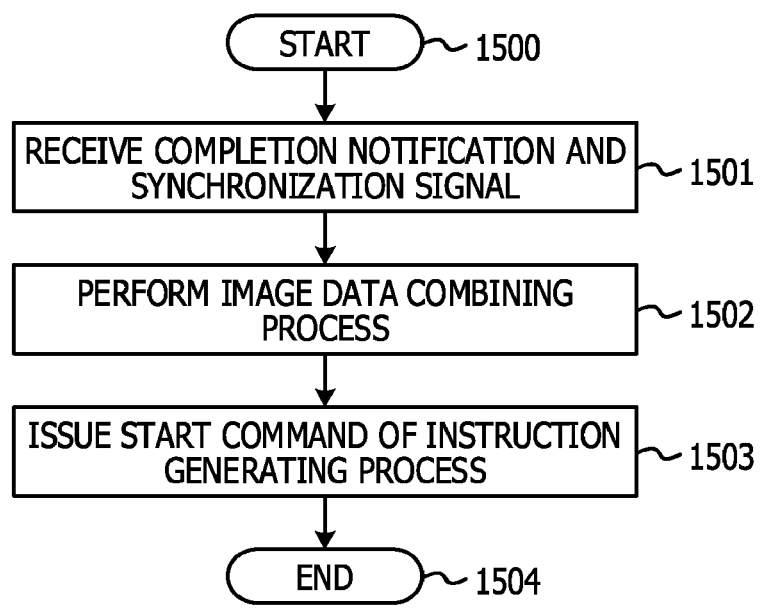
FIG. 15 is a flowchart of a process of a combining unit according to the first embodiment.

FIG. 15 is a flowchart of the image data combining process performed by the combining unit 170 according to the first embodiment. The process performed by the combining unit 170 is started from Process 1501. In Process 1501, the combining unit 170 receives the image-data-generating-process completion notification from the driver 130 and the synchronization signal Vsync from the timer 140. In Process 1502, the combining unit 170 performs the image data combining process based on the image data items stored in the first VRAM 210, and generates the combined image data. For example, when the image data generating process is not completed in the first frame, the combining unit 170 receives the completion notification later than the synchronization signal Vsync2 which is the start timing of the second frame. In such a case, the combining unit 170 does not perform the image data combining process in the second frame, and performs the image data combining process after the synchronization signal Vsync3 which is the start timing of the third frame is received. The generated combined image data is stored in the second VRAM 300. In Process 1503, the combining unit 170 issues the start command of the instruction generating process after the image data combining process is ended. The start command of the instruction generating process is transmitted to the instruction generating unit 110. Thereafter, the process is ended in Process 1504.

As discussed above, the instruction generating unit 110 generates the instructions regarding the plurality of partial regions, based on the number of partial regions set by the feedback control unit 160, and the GPU 200 starts the image data generating process after the instructions regarding the plurality of partial regions are generated. Thus, it is possible to reduce the time taken until the generation of all the image data items on the plurality of partial regions is ended after the GPU 200 starts the image data generating process, and it is possible to increase a period of time during which the image data generating unit 250 can be operated in the sleep mode. As a result, it is possible to suppress the power consumption.

When the image data generating process on the plurality of partial regions is not ended in the frame, the number of partial regions for which the instruction will be generated in the next frame is adjusted based on the time difference signal received by the feedback control unit 160 from the time difference detecting unit 150. Accordingly, it is possible to suppress an occurrence possibility that the image data generating process will not be ended in the frame.

As discussed above, the first embodiment has been described. In the first embodiment, the instruction generating unit 110 does not issue the instruction-generating-process end notification even though the instruction generating process on the partial regions is ended. The instruction generating unit 110 notifies the library 120 of the instruction-generating-process end notification after the instructions regarding as many partial regions as the number set by the feedback control unit 160 are generated. Accordingly, the instructions regarding the plurality of partial regions are transmitted to the driver 130 and the GPU 200 all at once.

Next, as a first modification example of the first embodiment, an example in which the instruction generating unit 110 issues the instruction-generating-process end notification whenever the instruction generating process on the partial regions is ended will be described.

Figure 16:
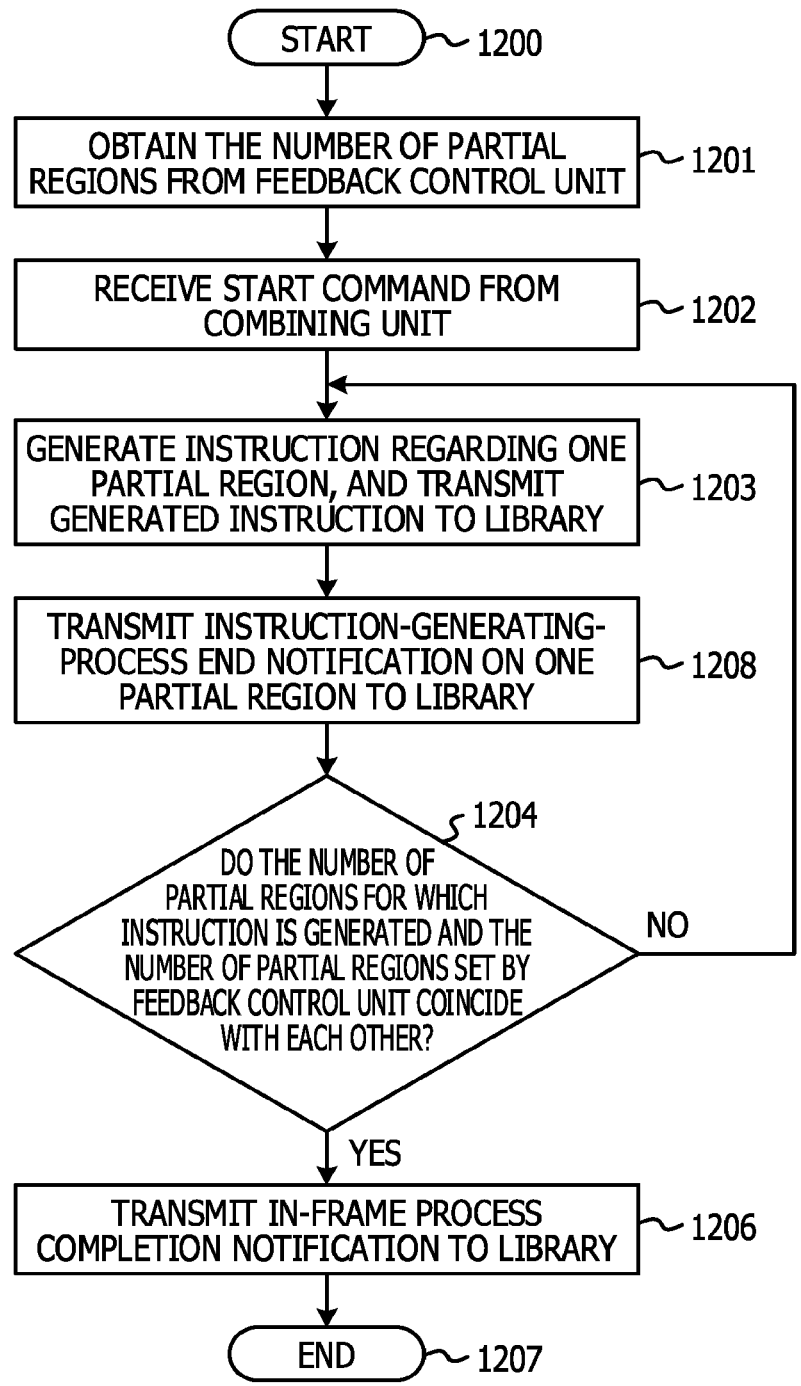
FIG. 16 is a flowchart of a process of an instruction generating unit according to a first modification example of the first embodiment.

FIG. 16 is a flowchart of the instruction generating process performed by the instruction generating unit 110 according to the first modification example of the first embodiment. The same processes as the processes described in FIG. 12 will be assigned the same reference numerals, and the description thereof will be appropriately omitted or simplified. The flowcharts of the processes performed by the driver 130, the feedback control unit 160 and the combining unit 170 according to the first modification example of the first embodiment are the same as the flowcharts illustrated in FIG. 11, FIG. 14 and FIG. 15.

After the process is started in Process 1200, the instruction generating unit 110 obtains the number of partial regions set by the feedback control unit 160 in Process 1201, receives the start command of the instruction generating process in Process 1202, generates the instruction regarding one partial region, and transmits the generated instruction to the library 120 in Process 1203. After Process 1203, in Process 1208, the instruction generating unit 110 transmits the instruction-generating-process end notification on one partial region to the library 120. This process is a process different from the process illustrated in FIG. 12. Thereafter, in Process 1204, the instruction generating unit 110 determines whether or not the number of partial regions for which the instruction is generated coincides with the number of partial regions set by the feedback control unit 160, and the process returns to Process 1203 or proceeds to Process 1206 based on the determined result. In Process 1206, the instruction generating unit 110 transmits the in-frame process completion notification indicating that all the processes in the frame are ended and another process is not performed in the frame to the library 120, and the process is emend in Process 1207.

Figure 17:
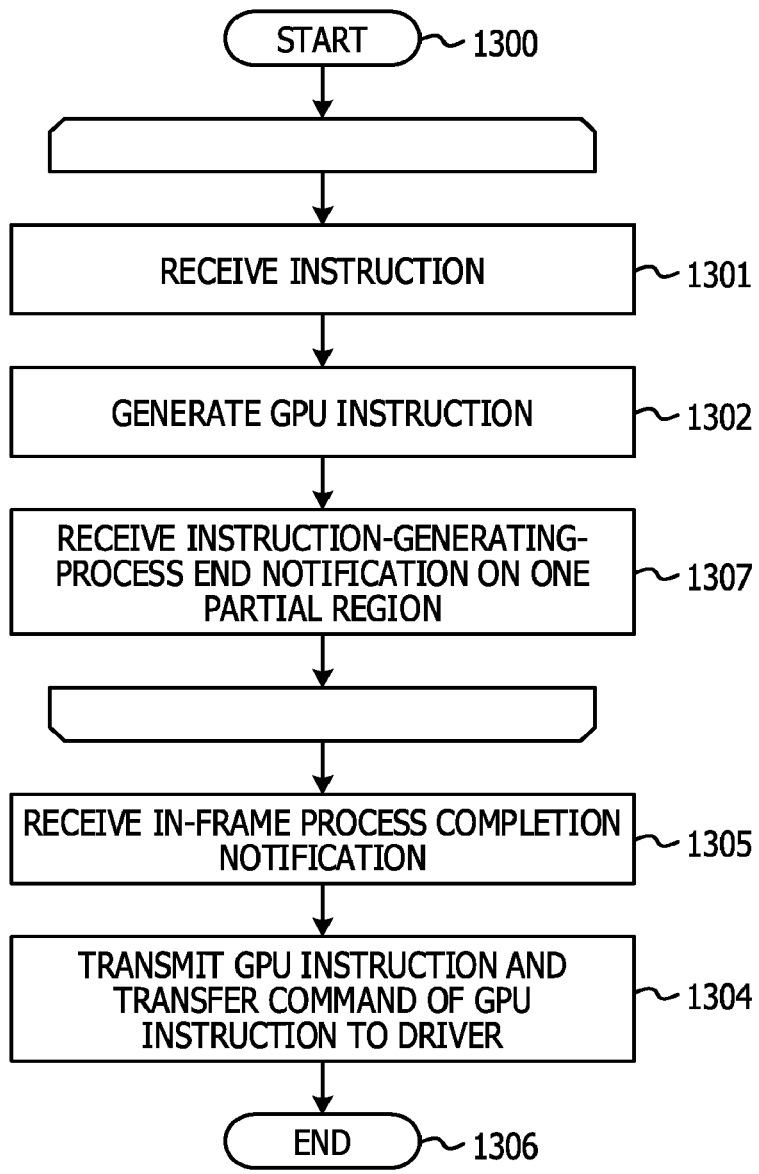
FIG. 17 is a flowchart of a process of a library according to the first modification example of the first embodiment.

FIG. 17 is a flowchart of the GPU instruction generating process of the library 120 according to the first modification example of the first embodiment. The same processes as the processes described in FIG. 13 will be assigned the same reference numerals, and the description thereof will be appropriately omitted or simplified. After the process is started in Process 1300, the library 120 receives the instructions in Process 1301, and generates the GPU instructions in Process 1302. The generated GPU instructions are retained by the library 120. In Process 1307, the library 120 receives the instruction-generating-process end notification on one partial region from the instruction generating unit 110. Process 1301, Process 1302 and Process 1307 form a loop, and are repeatedly performed until the in-frame process completion notification is received. The library 120 does not transmit the GPU instructions to the driver 130 even though the instruction-generating-process end notification is received in Process 1306, and the GPU instructions are retained by the library 120. Subsequently, in Process 1305, the library 120 receives the in-frame process completion notification from the instruction generating unit 110. In Process 1304, the library 120 transmits the retained GPU instructions to the driver 130 based on the in-frame process completion notification received in Process 1307, and transmits to the driver 130 the transfer command of the GPU instructions to the GPU 200.

Thereafter, as described in FIG. 14, the driver 130 receives the GPU instructions and the transfer command of the GPU instructions to the GPU 200 transmitted from the library 120, and transmits the GPU instructions to the GPU 200. The GPU 200 that receives the GPU instructions performs the image data generating process.

As stated above, in the first modification example of the first embodiment, the instruction generating unit 110 does not transmit the end notification when all the instruction generating processes on as many partial regions as the number set by the feedback control unit 160 are ended, and transmits the end notification whenever the instruction generating process on one partial region is ended. The library 120 retains the GPU instructions without transmitting the GPU instructions to the driver 130 even though the instruction-generating-process end notification is received, and transmits the GPU instructions to the driver 130 when the instruction generating unit 110 issues the in-frame process completion notification. Thus, it is possible to transmit the GPU instructions to the driver 130 after the instructions regarding the plurality of partial regions are generated without transmitting the GPU instructions regarding the plurality of partial regions to the GPU 200 for each partial region.

Next, a second modification example of the first embodiment will be described. It has been described in the first embodiment and the first modification example of the first embodiment that the library 120 generates the GPU instructions regarding as many partial regions as the set number, and transmits the generated GPU instructions to the driver 130. In contrast, in the second modification example of the first example, the library 120 transmits the generated GPU instructions to the driver 130 for each partial region. The driver 130 retains the GPU instructions regarding as many partial regions as the set number, and transmits the retained GPU instructions to the GPU 200.

Figure 18:
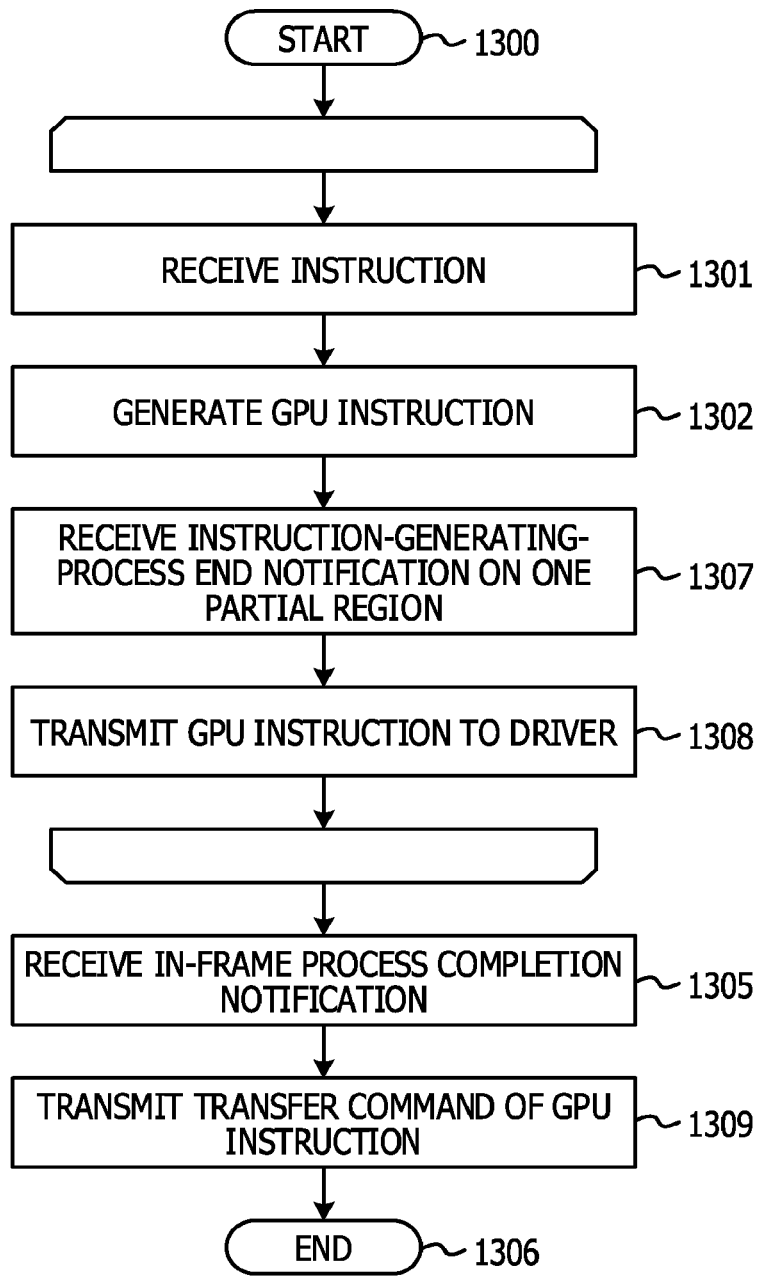
FIG. 18 is a flowchart of a process of a library according to a second modification example of the first embodiment.

FIG. 18 is a flowchart of the GPU instruction generating process performed by the library 120 according to the second modification example of the first example. The same processes as the processes described in FIG. 13 or FIG. 17 will be assigned the same reference numerals, and the description thereof will be appropriately omitted or simplified. The flowcharts of the processes performed by the instruction generating unit 110, the feedback control unit 160 and the combining unit 170 according to the second modification example of the first embodiment are the same as the flowcharts described in FIG. 16, FIG. 11 and FIG. 15.

After the process performed by the library 120 is started in Process 1300, the library 120 receives the instructions in Process 1301, and generates the GPU instructions in Process 1302. The generated GPU instructions are retained by the library 120. In Process 1307, the library 120 receives the instruction-generating-process end notification on one partial region from the instruction generating unit 110. In the present modification example, in Process 1308, the library 120 transmits the GPU instructions to the driver 130 based on the reception of the instruction-generating-process end notification on one partial region by the library 120 in Process 1307. That is, the library 120 transmits the GPU instruction to the driver 130 for each partial region without retaining the GPU instructions regarding the plurality of partial regions all at once. Process 1301, Process 1302, Process 1307 and Process 1308 form a loop, and are repeatedly performed until the GPU instructions regarding as many partial regions as the number set by the feedback control unit 160 are transmitted to the driver 130. Thereafter, in Process 1305, the library 120 receives the in-frame process completion notification from the instruction generating unit 110. Since the library 120 transmits the GPU instruction to the driver 130 whenever the instruction-generating-process end notification regarding one partial region is received, the GPU instruction is not basically retained at a timing when the in-frame process completion notification is received in Process 1305. For this reason, the library 120 does not transmit the GPU instruction to the driver 130 even though the in-frame process completion notification is received, and transmits the transfer command the GPU instruction to the GPU 200 in Process 1309, and the process is ended in Process 1306.

FIG. 19 is a flowchart of the GPU instruction transmitting process of the driver 130 according to the second modification example of the first embodiment. The same processes as the processes described in FIG. 14 will be assigned the same reference numerals, and the description thereof will be appropriately omitted or simplified. The library 120 described in FIG. 18 transmits the GPU instruction for each partial region. After the process is started from Process 1400, in Process 1408, the driver 130 receives the GPU instructions transmitted from the library 120 for each partial region, and sequentially stores the received GPU instructions. Process 1408 is repeatedly performed on all of as partial regions as the set number until the driver 130 receives the GPU instructions. In Process 1409, the driver 130 receives the transfer command of the GPU instructions to the GPU 200 from the library 120, and transmits the GPU instructions stored in Process 1403 to the GPU 200 after the start command is transmitted to the GPU 200 in Process 1402. The subsequent processes are the same as the processes described in FIG. 14.

Thus, after all the GPU instructions regarding as many partial regions as the set number are retained in the driver 130, the GPU instructions are transmitted to the GPU 200.

As discussed above, the first embodiment including the two modification examples has been described. In the first embodiment, the image data generating process performed by the GPU 200 is not started until all the instructions (GPU instructions) regarding as many partial regions as the number set by the feedback control unit 160 are generated. Thus, it is possible to reduce the time taken until the image data generating process on as many partial regions as the set number is completed after the image data generating process performed by the GPU 200 is started. It is possible to ensure the period of time during which the image data generating unit 250 can be controlled in the sleep mode.

Next, an algorism example regarding the method of setting the number of partial regions performed by the feedback control unit 160 according to the first embodiment will be described. The algorism example described herein is merely an example, and the number of partial regions may be set using another algorism.

Figure 20A:
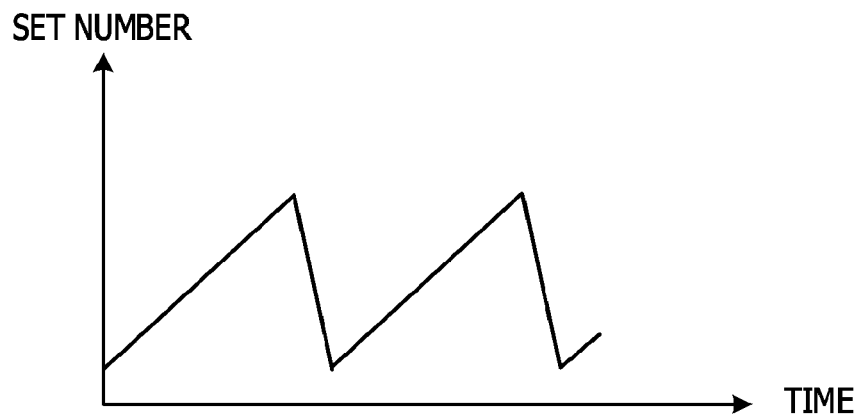
FIGS. 20A and 20B are diagrams illustrating an example of a method of setting the number of partial regions for which an instruction is generated in one frame according to the first embodiment.
Figure 20B:
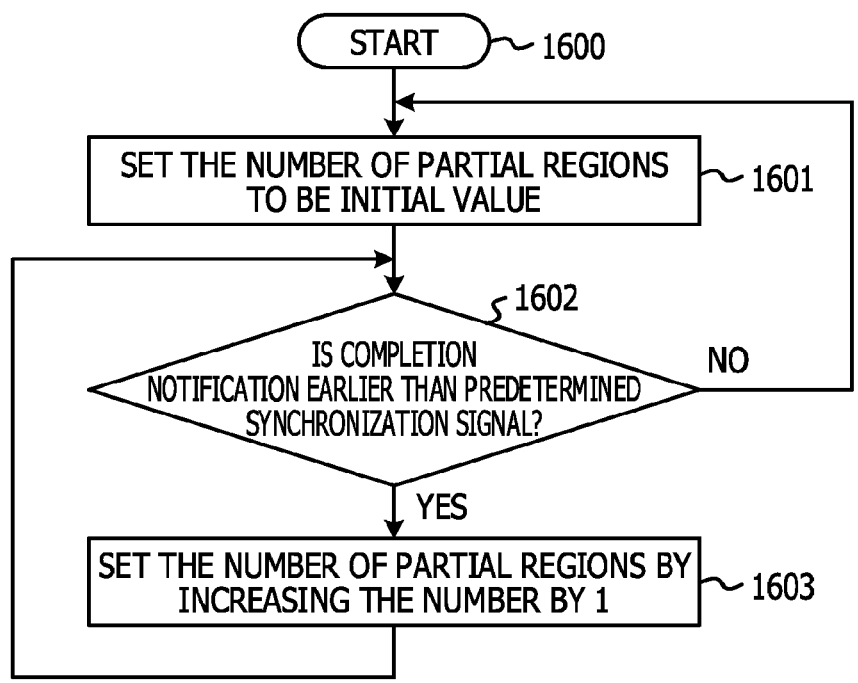

FIGS. 20A and 20B illustrate an example of the method of setting the number of partial regions for which the instruction is generated in one frame in the first embodiment. FIG. 20A is a diagram illustrating a first algorism example regarding the method of setting the number of partial regions performed by the feedback control unit 160. In FIG. 20A, a horizontal axis represents a time, and a vertical axis represents the set number of partial regions. Initially, the feedback control unit 160 sets an initial value, for example, 1 as a set value of the number of partial regions, and increases the set value for each frame by a certain number, for example, 1 at a time. All the image data generating processes on as many partial regions as the set number in a certain frame are not completed in the frame, the driver 130 returns the set number to the initial value. The set number for each frame is increased again by the certain number at a time.

A flowchart of a process of setting the number of partial regions performed by the feedback control unit 160 for realizing such a setting method is illustrated in FIG. 20B. The process performed by the feedback control unit 160 is started from Process 1600. In Process 1601, the feedback control unit 160 sets the number of partial regions to be the initial value. In Process 1602, the feedback control unit 160 determines whether or not the image-data-generating-process completion notification is received earlier than a predetermined synchronization signal Vsync based on the time difference signal from the time difference detecting unit 150. In Process 1602, when it is determined that the image-data-generating-process completion notification is received earlier than the predetermined synchronization signal Vsync, the process proceeds to Process 1603, and the feedback control unit 160 sets the number of partial regions by increasing the number of partial regions by a predetermined number, and the process returns to Process 1602. In Process 1602, when it is determined that the image-data-generating-process completion notification is received later than the predetermined synchronization signal Vsync, the process returns to Process 1601.

Figure 21A:
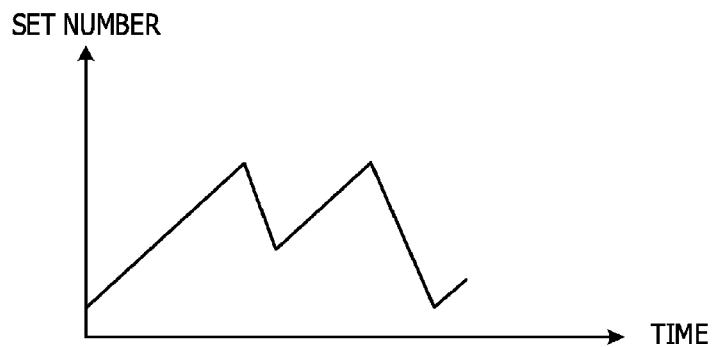
FIGS. 21A and 21B are diagrams illustrating another example of the method of setting the number of partial regions for which the instruction is generated in one frame according to the first embodiment.
Figure 21B:
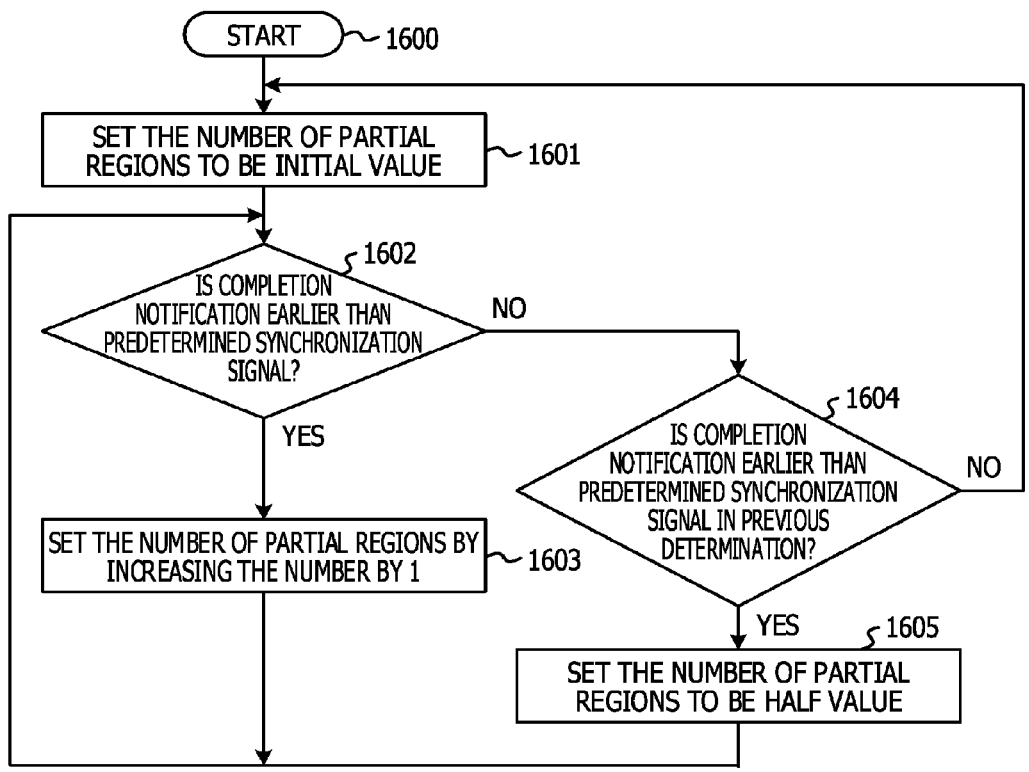

FIGS. 21A and 21B illustrate another example of the method of setting the number of partial regions for which the instruction is generated in one frame according to the first embodiment. FIG. 21A is a diagram illustrating another algorism example of the method of setting the number of partial regions performed by the feedback control unit 160. As illustrated in FIG. 21A, the feedback control unit 160 initially sets the set value of the number of partial regions to be an initial value, for example, 1, and increases the set number for each frame by a certain number, for example, 1 at a time. When all the image data generating processes on as many partial regions as the set number are not completed in the frame, the driver 130 sets the set value of the number of partial regions to be a half value. When the frame in which the image data generating process is not completed occurs two consecutive times, the set value is returned to the initial value. The set value for each frame is increased again by the certain number at a time.

A flowchart of a process performed by the feedback control unit 160 for realizing the method of determining such a set number is illustrated in FIG. 21B.

The same processes as the processes described in FIG. 20B will be assigned the same reference numerals, and the description thereof will be appropriately omitted or simplified. In Process 1602, when it is determined that the image-data-generating-process completion notification is received later than a predetermined synchronization signal Vsync, the process proceeds to Process 1604. In Process 1604, the feedback control unit 160 determines whether or not the image-data-generating-process completion notification is received earlier than the predetermined synchronization signal Vsync in the one-previous frame. In Process 1604, when it is determined that the image-data-generating-process completion notification is received later than the predetermined synchronization signal Vsync in the one-previous frame, the process returns to Process 1601. In Process 1604, when it is determined that the image-data-generating-process completion notification is received earlier than the predetermined synchronization signal Vsync in the one-previous frame, the process proceeds to Process 1605. The feedback control unit 160 sets the set number of partial regions to be a half value, and the process proceeds to Process 1602.

Figure 22A:
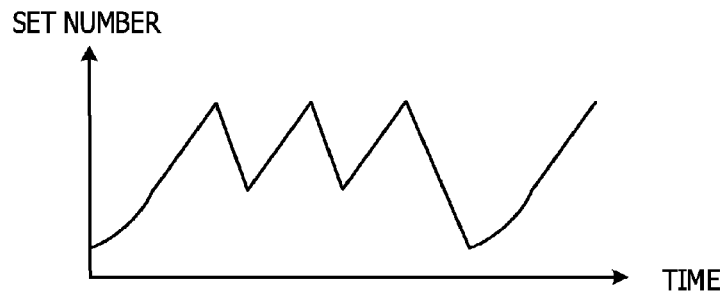
FIGS. 22A and 22B are diagrams illustrating still another example of the method of setting the number of partial regions for which the instruction is generated in one frame according to the first embodiment.
Figure 22B:
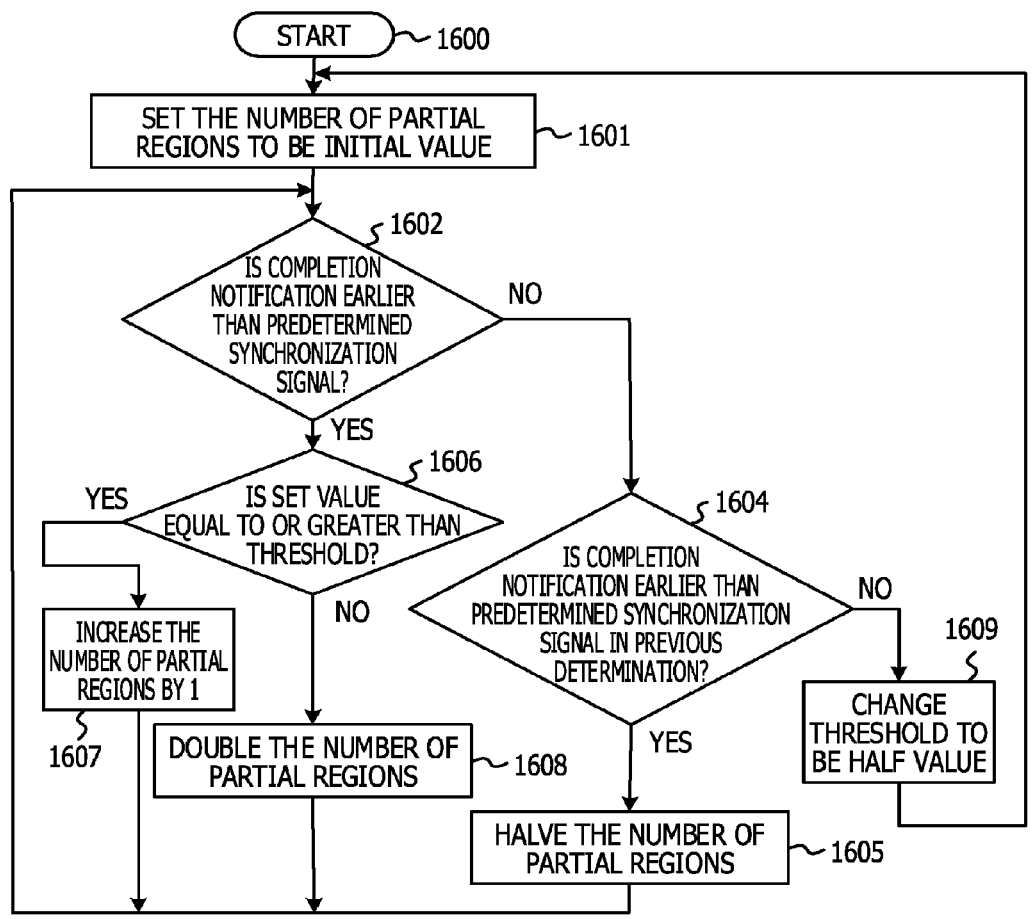

FIGS. 22A and 22B are diagrams illustrating still another example of the method of setting the number of partial regions for which the instruction is generated in one frame according to the first example. FIG. 22A is a diagram illustrating still another algorism example of the method of setting the number of partial regions performed by the feedback control unit 160. As illustrated in FIG. 22A, the feedback control unit 160 initially sets the number of partial regions to be an initial value, for example, 1. The feedback control unit 160 exponentially increases the set number for each frame. For example, the feedback control unit 160 doubles the set number for each frame. When the set number reaches a predetermined threshold, the feedback control unit 160 increases the set number for each frame by a certain number, for example, 1 at a time. When all the image data generating processes are not completed in the frame, the feedback control unit 160 sets the number of partial regions to be a half value. When the frame in which all the image data generating processes are not completed occurs two consecutive times, the set value is returned to the initial value.

A flowchart of a process of the feedback control unit 160 for realizing such an algorism is illustrated in FIG. 22B. The same processes as the processes described in FIG. 20B or FIG. 21B will be assigned the same reference numerals, and the description thereof will be appropriately omitted or simplified. In Process 1602, when it is determined that the image-data-generating-process completion notification is received earlier than the predetermined synchronization signal Vsync, the process proceeds to Process 1606. In Process 1606, the feedback control unit 160 determines whether or not the set number is equal to or longer than a predetermined threshold. In Process 1606, when it is determined that the set number is equal to or longer than the predetermined threshold, the process proceeds to Process 1607, and when it is determined that the set number is less than the predetermined threshold, the process proceeds to Process 1608. In Process 1607, the feedback control unit 160 increases the number of partial regions by 1, and the process returns to Process 1602. In Process 1608, the feedback control unit 160 sets the number of partial regions by doubling the number of partial regions, and the process returns to Process 1602.

Even though the process proceeds to Process 1604 from Process 1602, when it is determined that the image-data-generating-process completion notification is received later than the predetermined synchronization signal Vsync in the one-previous frame in Process 1604, the feedback control unit 160 changes the threshold to a half value in Process 1609, and the process returns to Process 1601. When it is determined that the image-data-generating-process completion notification is received earlier than the predetermined synchronization signal Vsync in the one-previous frame in Process 1604, the process proceeds to Process 1605. The feedback control unit 160 sets the number of partial regions to be a half value, and the process returns to Process 1602.

Figure 23A:
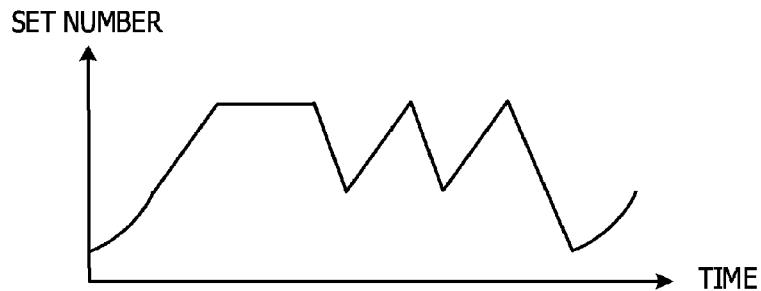
FIGS. 23A and 23B are diagrams illustrating still another example of the method of setting the number of partial regions for which the instruction is generated in one frame according to the first embodiment.
Figure 23B:
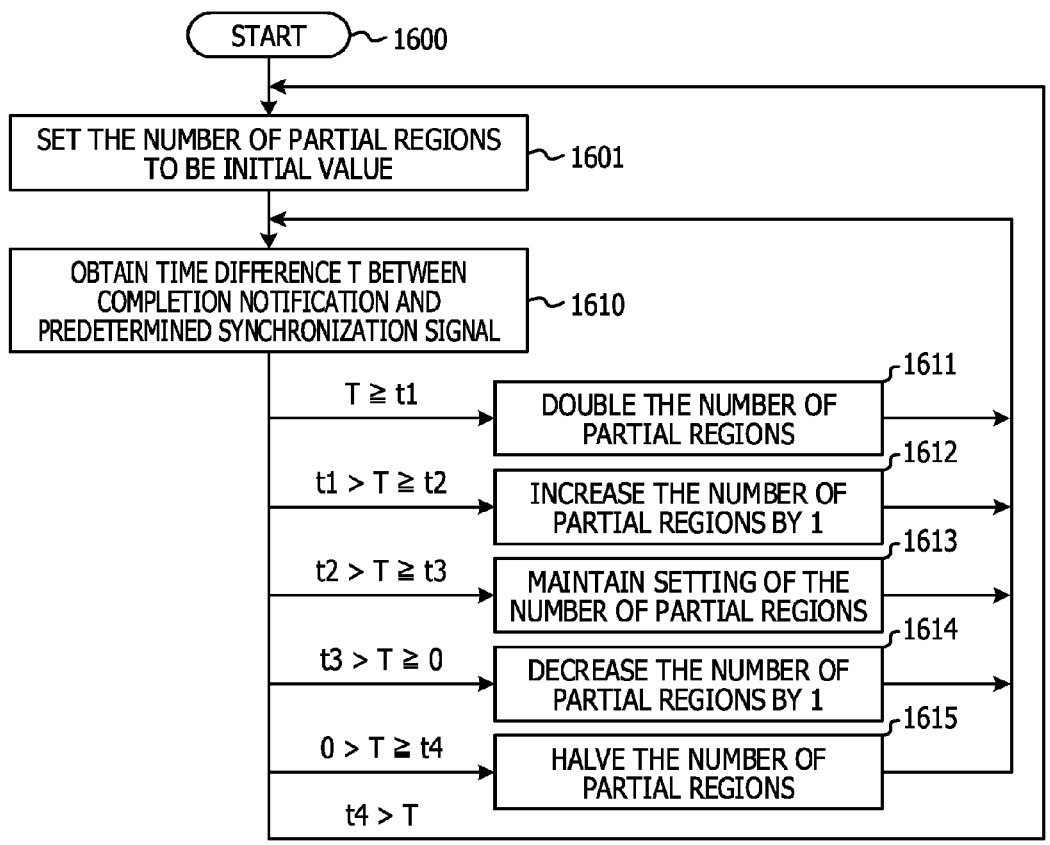

FIG. 23A and FIG. 23B are diagrams illustrating still another example of the method of setting the number of partial regions for which the instruction is generated in one frame according to the first embodiment. FIG. 23A is a diagram illustrating still another algorism example of the method of setting the number of partial regions performed by the feedback control unit 160. According to this algorism, the number of partial regions is set based on a remaining time T of the frame at a timing when the image-data-generating-process completion notification is issued. In the following description, it is assumed that t1, t2, t3 and t4 represent a time, t1, t2 and t3 are a positive value, t1 is the longest time, and t3 is the shortest time. It is assumed that t4 is a negative value. The remaining time T of the frame being a negative value means that the image data generating process is not completed in the frame and is completed after the next frame is started.

As illustrated in FIG. 23B, the feedback control unit 160 initially sets the number of partial regions to be an initial value, for example, 1 in Process 1601. In Process 1610, the feedback control unit 160 obtains the time difference signal including the time difference information from the time difference detecting unit 150. The time difference information is information regarding a time difference T between the completion notification and the predetermined synchronization signal. When the remaining time T of the frame is equal to or longer than t1, the feedback control unit 160 exponentially increases the set number in Process 1611. When T is shorter than t1 and is equal to or longer than t2, the feedback control unit 160 increases the set number by 1 in Process 1612. When T is shorter than t2 and is equal to or longer than t3, the feedback control unit 160 maintains the set number with no change in Process 1613. When T is shorter than t3 and is a positive value, the feedback control unit 160 decreases the set number by 1 in Process 1614. When T is a negative value and is equal to or more than t4, the feedback control unit 160 decreases the set number to be a half value in Process 1615. When T is less than t4, the feedback control unit 160 returns to Process 1601, and sets the set value to be the initial value.

Second Embodiment

In the first embodiment and the modification examples thereof, the method of determining the number of partial regions to be processed in the next frame based on whether or not all the image data generating processes on as many partial regions as the number set in the one-previous frame are completed in the frame has been described. In this method, the instruction generating unit 110 has performed the instruction generating process based on the number set by the feedback control unit 160. By contrast, in the second embodiment, when the instruction generating process on one partial region is ended, the CPU 100 determines whether or not to additionally perform the instruction generating process on another partial region based on the remaining time of the frame. When the remaining time is shorter than a predetermined time, the instruction generating process is not additionally performed on another partial region. The GPU instructions generated for the plurality of partial regions are retained in the CPU 100, and when it is determined that the remaining time is shorter than the predetermined time, the retained GPU instruction are transmitted to the GPU 200. Similarly to the first embodiment, it is possible to reduce the time taken from the start of the image data generating process on the plurality of partial regions performed by the GPU 200 to the end of thereof.

In the second embodiment, when the image data generating process on plurality of the partial regions is not completed in the frame, by delaying a timing when the instruction generating unit 110 starts the instruction generating process in the next frame, the number of partial regions for which the instruction is generated in the frame is reduced. Thus, it is possible to increase the possibility that all the image data generating processes will be completed in the frame.

In the second embodiment, the hardware configuration of the display apparatus 1 illustrated in the first embodiment may also be applied. The definition of the terms (names) described in the first embodiment is applied to in the second embodiment unless the context clearly indicates otherwise.

Figure 24:
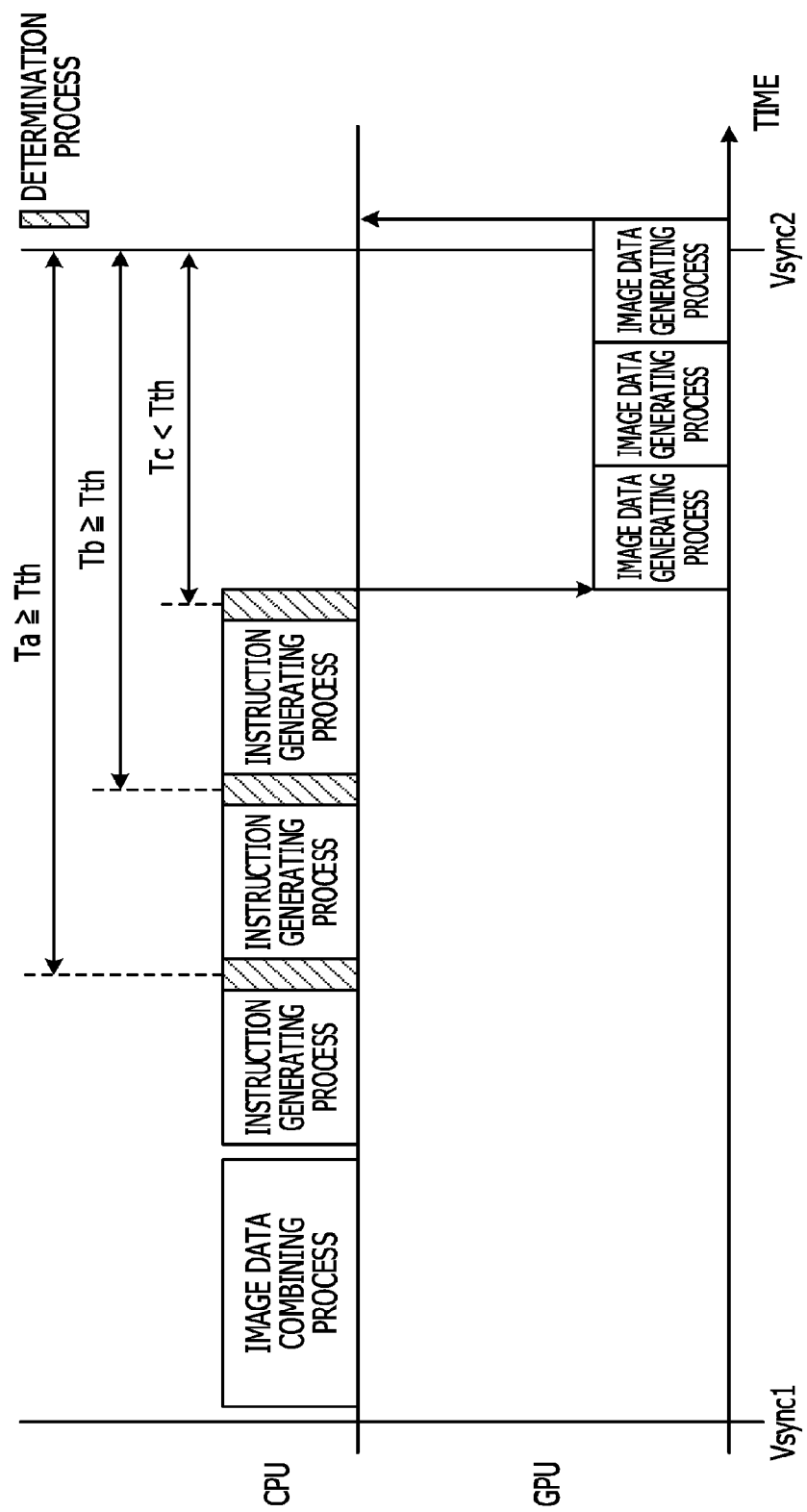
FIG. 24 is a diagram illustrating an example of a timing chart of processes of a CPU and a GPU according to a second embodiment.

FIG. 24 is an example of a timing chart of the processes performed by a CPU 100 and a GPU 200 according to the second embodiment. In FIG. 24, a horizontal axis represents a time. In FIG. 24, when the instruction regarding one partial region is generated, the CPU 100 determines whether or not to additionally perform the instruction generating process on an additional partial region based on the remaining time of the frame. When the remaining time is longer than a predetermined time Tth, the instruction generating process is additionally performed on another partial region, and when the remaining time is shorter than the predetermined time Tth, the instruction generating process is not additionally performed on the partial region. In the example illustrated in FIG. 24, in the determination performed at a timing when the instruction regarding the third partial region is generated, it is determined that the remaining time Tc of the frame is shorter than the predetermined time Tth. In this case, the CPU 100 does not additionally perform the instruction generating process, and transmits the GPU instructions regarding three partial regions to the GPU 200.

The GPU 200 that receives the GPU instructions generates the image data items regarding the three partial regions. In the example illustrated in FIG. 24, the generation of the image data items regarding the three partial regions is not completed in the frame. In such a case, the CPU 100 delays the start timing of the instruction generating process in the next frame. The reason why the start timing of the instruction generating process is delayed will be described with reference to FIG. 25.

Figure 25:
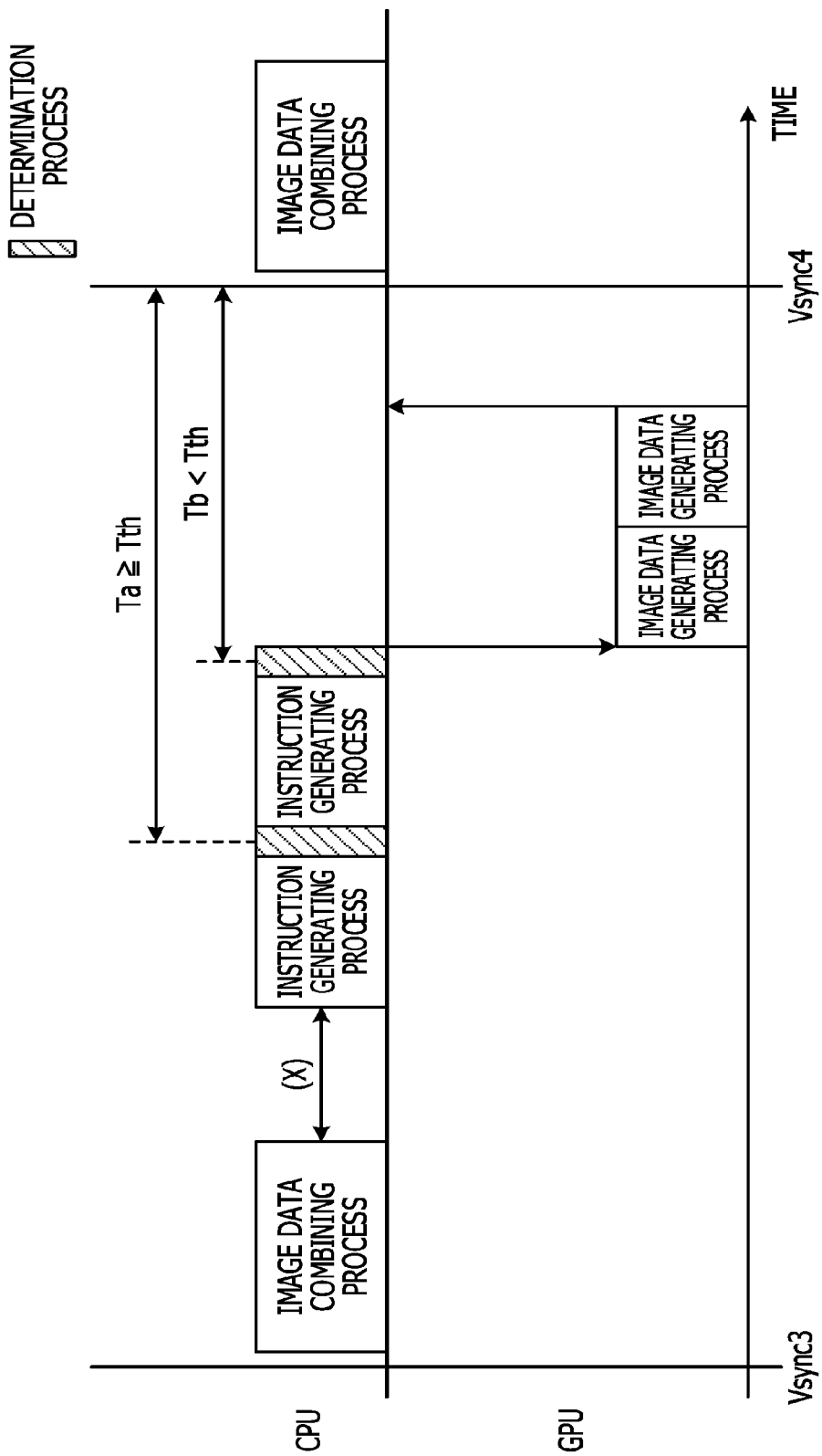
FIG. 25 is a diagram illustrating an example of the timing chart of the processes of the CPU and the GPU according to the second embodiment.

FIG. 25 is a timing chart of the processes performed by the CPU 100 and the GPU 200 when the start timing of the instruction generating process is delayed. As illustrated in FIG. 24, when the image data generating process on the plurality of partial regions is not completed in the frame, the CPU 100 delays the start timing of the instruction generating process. More specifically, the CPU 100 lengthens the time (period of time X in FIG. 25) until the initial instruction generating process is started after the image data combining process is ended. Thus, a remaining time Tb of the frame is shorter than the predetermined time Tth at a time when the instruction generating processes on two partial regions are ended. For this reason, the instruction generating process is not performed on the third partial region in this frame. As a result, it is possible to end the image data generating process performed by the GPU 200 in the frame. Hereinafter, a method of adjusting the start timing of the instruction generating process will be described in detail.

Figure 26:
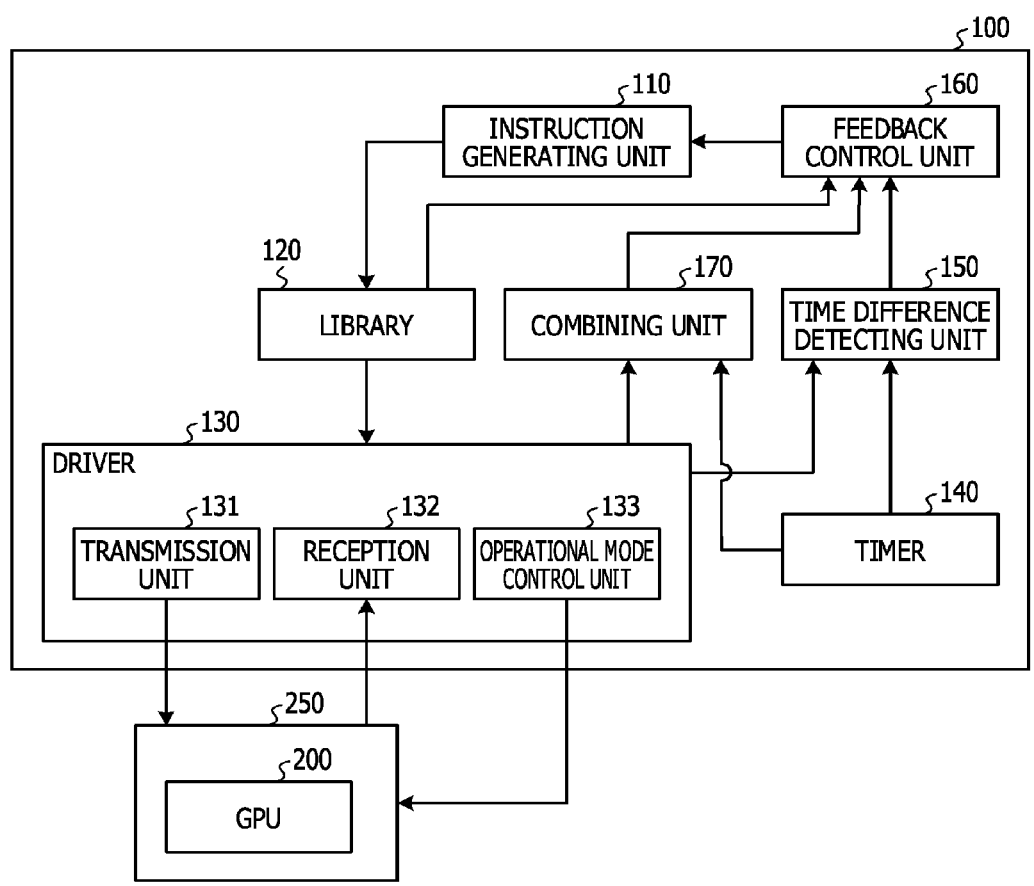
FIG. 26 is a functional block diagram of the CPU according to the second embodiment.

FIG. 26 is a functional block diagram of the CPU 100 according to the second embodiment. The CPU 100 realizes the respective functions illustrated in FIG. 26 by executing a predetermined computer program stored in a memory 400 or another storage device that can be accessed by the CPU 100. Similarly to the first embodiment, the CPU 100 functions as an instruction generating unit 110, a library 120, a driver 130, a timer 140, a time difference detecting unit 150, a feedback control unit 160, and a combining unit 170. The differences between the functional blocks of the first and second embodiment will be described.

In the second embodiment, the instruction generating unit 110 receives the start command of the instruction generating process from the feedback control unit 160 not the combining unit 170, generates the instruction regarding the partial region, and transmits the generated instruction to the library 120. The instruction generating unit 110 determines whether or not to additionally perform the instruction generating process on another partial region within the remaining time of the frame whenever the instruction generating process on the partial region is ended. When it is determined not to perform the instruction generating process on another partial region, the instruction generating unit 110 transmits an in-frame process completion notification indicating that the process in the frame is completed to the library 120.

The library 120 generates the GPU instructions based on the instructions generated by the instruction generating unit 110, and transmits the generated GPU instructions to the driver 130. The library 120 counts the number of partial regions for which the instruction is generated, and notifies the feedback control unit 160 of the counted number. The driver 130 transmits the GPU instructions to the GPU 200, receives the image-data-generating-process end notification from the GPU 200, transmits the image-data-generating-process completion notification to the time difference detecting unit 150 and the combining unit 170, and controls the operational mode of the image data generating unit 250. The timer 140 generates the synchronization signal Vsync at a predetermined time interval, and transmits the generated synchronization signal to the time difference detecting unit 150 and the combining unit 170. The time difference detecting unit 150 transmits the time difference signal to the feedback control unit 160 based on the completion notification received from the reception unit 132 of the driver 130, and the synchronization signal Vsync received from the timer 140. The feedback control unit 160 sets a delay time for delaying the start of the instruction generating process in the next frame based on the time difference signal received from the time difference detecting unit 150 and the number of partial regions on which the instruction generating process is performed, which is received from the library 120. The combining unit 170 performs the image data combining process, and transmits the start command of the instruction generating process to the feedback control unit 160. The combining unit 170 that receives the start command of the instruction generating process delays the start command of the instruction generating process based on the set delay time, and transmits the delayed start command to the instruction generating unit 110. Thus, it is possible to control the time when the instruction generating unit 110 starts the instruction generating process based on the delayed time set by the feedback control unit 160.

Figure 27:
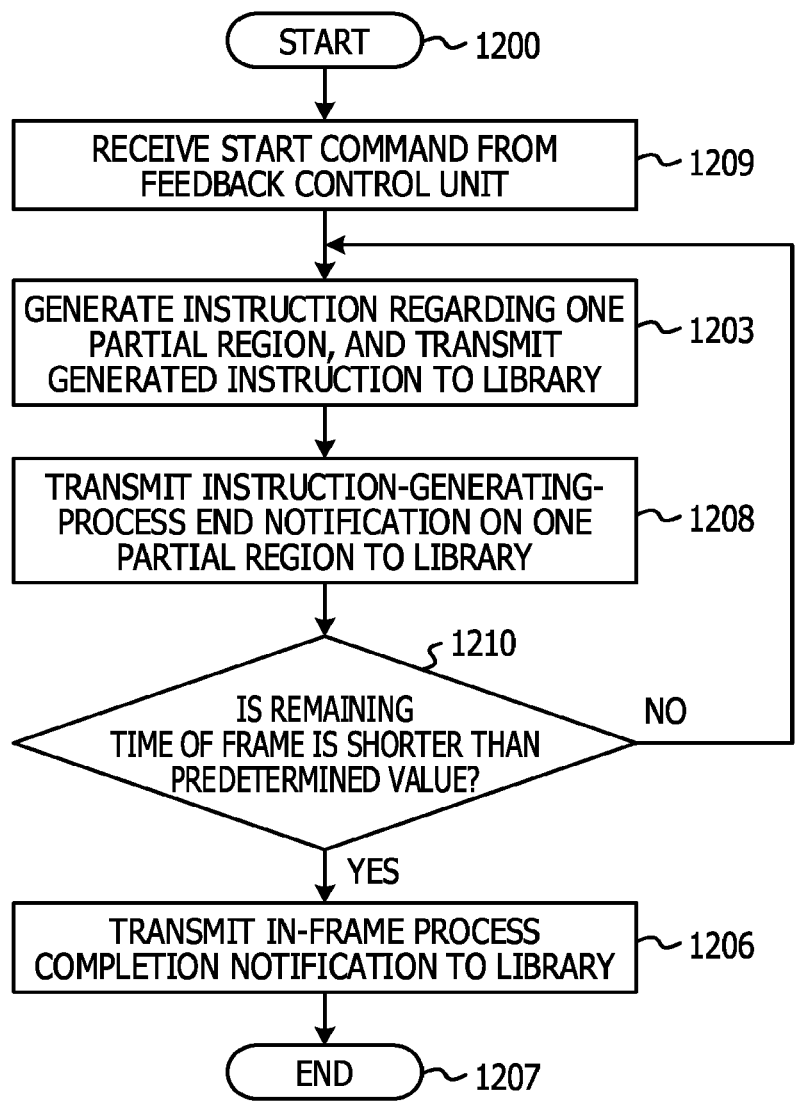
FIG. 27 is a flowchart of a process of an instruction generating unit according to the second embodiment.

FIG. 27 is a flowchart of the instruction generating process of the instruction generating unit 110 according to the second embodiment. The same processes as the processes described in FIG. 12 or FIG. 16 will be assigned same reference numerals, and the description thereof will be appropriately omitted or simplified. The flowchart of the processes performed by the driver 130 and the combining unit 170 according to the second embodiment is the same as the flowchart illustrated in FIG. 14 and FIG. 15.

After the process performed by the instruction generating unit 110 is started from Process 1200, the instruction generating unit 110 receives the start command of the instruction generating process from the feedback control unit 160 in Process 1209. The instruction generating unit 110 generates the instruction regarding one partial region in Process 1203, transmits the generated instruction to the library 120, and transmits the instruction-generating-process end notification on one partial region to the library 120 in Process 1208. When the instruction generating process on one partial region is ended, the instruction generating unit 110 determines whether or not the remaining time of the frame is shorter than the predetermined time in Process 1210. When it is determined that the remaining time of the frame is equal to or longer than the predetermined time in Process 1210, the process returns to Process 1203, and the instruction generating unit additionally generates the instruction regarding another partial region. When it is determined that the remaining time of the frame is shorter than the predetermined time in Process 1210, the process proceeds to Process 1206, and the instruction generating unit transmits the in-frame process completion notification to the library 120, and ends the process in Process 1207. As stated above, in the second embodiment, the instruction generating unit 110 determines whether or not to additionally generate the instruction regarding another partial region based on the remaining time of the time whenever the generation of the instruction regarding each partial region is ended.

Figure 28:
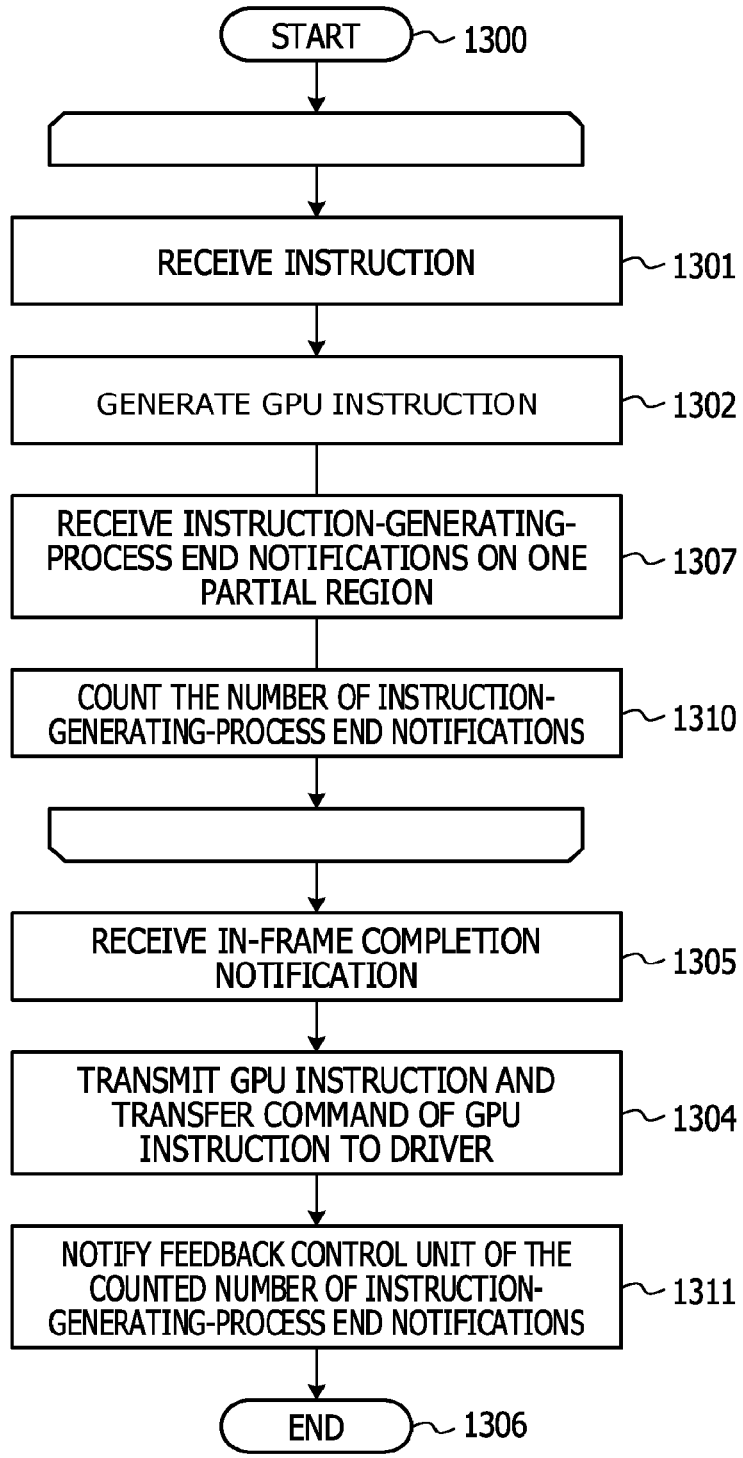
FIG. 28 is a flowchart of a process of a library according to the second embodiment.

FIG. 28 is a flowchart of the GPU instruction generating process performed by the library 120 according to the second embodiment. The same processes as the processes described in FIG. 13, FIG. 17 or FIG. 18 will be assigned the same reference numerals, and the description thereof will be appropriately omitted or simplified. The process performed by the library 120 is started from Process 1300. The library 120 receives the instructions from the instruction generating unit 110 in Process 1301, and generates the GPU instructions based on the received instructions in Process 1302. The library 120 receives the instruction-generating-process end notification on one partial region in Process 1307. In Process 1310, the library 120 counts the number of received instruction-generating-process end notifications. In Process 1307, the library 120 retains the generated GPU instructions without transmitting the GPU instructions to the driver 130 even though the instruction-generating-process end notification is received. Process 1301, Process 1302, Process 1307 and Process 1310 form a loop, and are repeatedly performed until the in-frame process completion notification is received from the instruction generating unit 110. When the in-frame process completion notification is received in Process 1305, the library 120 transmits the GPU instructions and the transfer command of the GPU instructions to the driver 130 in Process 1304. The library 120 notifies the feedback control unit 160 of the counted number of instruction-generating-process end notifications, that is, the number of partial regions on which the instruction generating process is performed in the frame in Process 1311, and ends the process in Process 1306.

As mentioned above, even though the instruction-generating-process end notification is received for each partial region, the library 120 retains the GPU instructions without transmitting the GPU instructions to the driver 130, and transmits the GPU instructions to the driver 130 after the in-frame process completion notification is received. The driver 130 receives the GPU instructions and the transfer command of the GPU instructions from the library 120, and transmits the GPU instructions to the GPU 200. Through such processes, it is possible to start the image data generating process of the GPU 200 after the GPU instructions regarding the plurality of partial regions are generated in the CPU 100, and it is possible to reduce the time from the start of the image data generating process on the plurality of partial regions to the end thereof.

Figure 29:
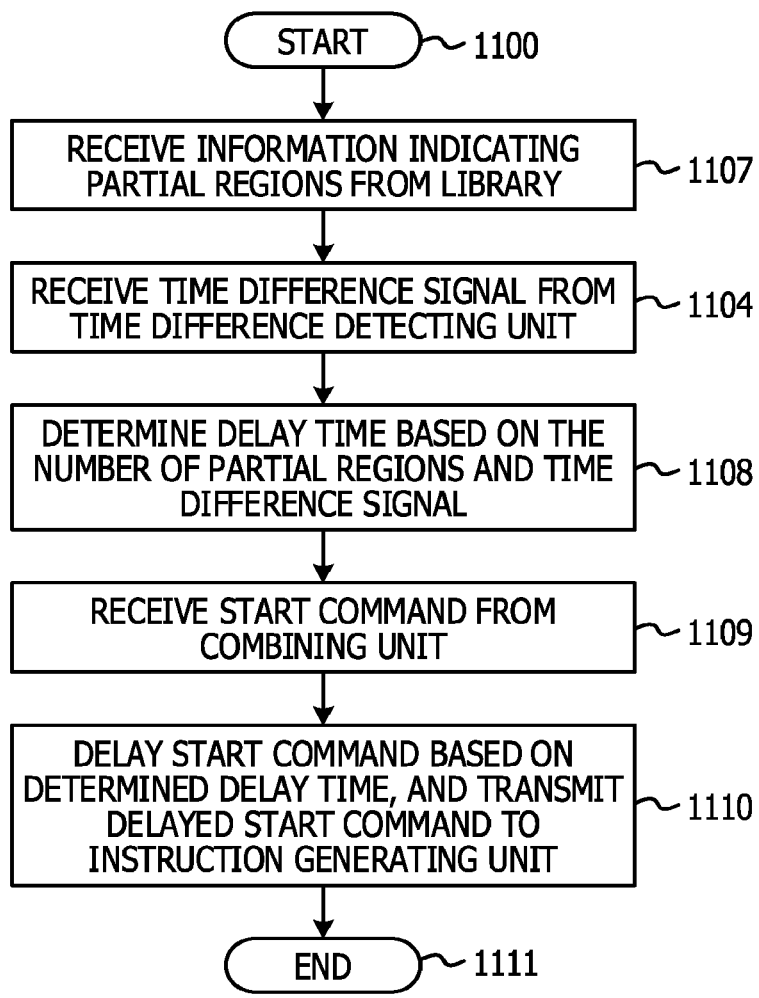
FIG. 29 is a flowchart of a process of a feedback control unit according to the second embodiment.

FIG. 29 is a flowchart of a process of setting the delay time of the start command of the instruction generating process performed by the feedback control unit 160 according to the second embodiment. The same processes as the processes described in FIG. 11 will be assigned the same reference numeral, and the description thereof will be appropriately omitted or simplified.

The process performed by the feedback control unit 160 is started from Process 1100. In Process 1107, the feedback control unit 160 receives information indicating the number of partial regions for which the instruction is generated from the library 120. After the time difference signal is received from the time difference detecting unit 150 in Process 1104, the feedback control unit 160 determines the delay time of the start timing of the instruction generating process based on the time difference and the number of the partial regions for which the instruction is generated in Process 1108. In Process 1109, the feedback control unit 160 receives the start command of the instruction generating process from the combining unit 170. In Process 1110, the feedback control unit 160 delays the start command of the received instruction generating process based on the delay time obtained in Process 1108, transmits the delayed start command to the instruction generating unit 110, and ends the process in Process 1111.

As described above, in the second embodiment, the start command of the instruction generating process issued by the combining unit 170 is transmitted to the feedback control unit 160. The feedback control unit 160 adjusts the start timing of the instruction generating process performed by the instruction generating unit 110. For example, when the image data generating process performed by the GPU 200 is not completed in the frame in the one-previous frame, the feedback control unit 160 delays the start timing of the instruction generating process performed by the instruction generating unit 110. Thus, it is possible to suppress the number of partial regions for which the instruction is generated in the next frame, and it is possible to increase the possibility that the image data generating process will be completed in the frame.

Next, a first modification example of the second embodiment will be described. In the second embodiment, the library 120 counts the number of partial regions for which the instruction is generated in the frame by counting the number of the instruction-generating-process end notifications, and notifies the feedback control unit 160 of the counted number. In contrast, in the first modification example of the second embodiment, the driver 130 counts the number of instruction-generating-process end notifications, and notifies the feedback control unit 160 of the counted value.

In FIG. 28 illustrating the flowchart of the process of the library 120 according to the second embodiment, the library 120 receives the instruction-generating-process end notifications in Process 1306, and counts the number of instruction-generating-process end notifications in Process 1310. By contrast, in the first modification example of the second embodiment, after the library 120 performs Process 1306, the library 120 transfers the instruction-generating-process end notifications to the driver 130 in place of Process 1310, and does not perform Process 1311. The driver 130 counts the number of instruction-generating-process end notifications transferred from the library 120. Thereafter, the driver 130 notifies the feedback control unit 160 of the counted number of instruction-generating-process end notifications based on the fact that the GPU instructions and the transfer command of the GPU instructions are received from the library 120.

As stated above, in the first modification example of the second embodiment, the driver 130 counts the number of instruction-generating-process end notifications, and notifies the feedback control unit 160 of the counted number.

Next, a second modification example of the second embodiment will be described. In the second embodiment, the library 120 generates the GPU instructions regarding the plurality of partial regions, and retains the generated GPU instructions, and transmits the retained GPU instructions from the library 120 to the driver 130 after the in-frame process completion notification is issued from the instruction generating unit 110. In the second modification example of the second embodiment, the GPU instructions generated by the library 120 are transmitted to the driver 130 for each partial region, and the driver 130 retains the GPU instructions regarding the plurality of partial regions. After the frame-in process completion notification is issued from the instruction generating unit 110, the GPU instruction is transmitted from the driver 130 to the GPU 200.

In FIG. 28 illustrating the flowchart of the process of the library 120 according to the second embodiment, the GPU instructions generated by the library 120 in Process 1302 are retained by the library 120 until the in-frame process completion notification is received in Process 1307. By contrast, in the second modification example of the second embodiment, when the instruction-generating-process end notifications are received in Process 1307, the library 120 transmits the GPU instructions generated in Process 1302 to the driver 130. In this case, the library 120 does not basically retain the GPU instructions at a timing when the in-frame process completion notification is received in Process 1307. For this reason, after the in-frame process completion notification is received, the library 120 transmits the transfer command of the GPU instructions to the driver 130 in Process 1304. Meanwhile, the driver 130 receives the GPU instructions transmitted from the library 120, retreat the received GPU instructions, and transmits the GPU instructions to the GPU 200 after the transfer command of the GPU instructions is received from the library 120.

As discussed above, in the second modification example of the second embodiment, the GPU instructions generated by the library 120 are transmitted to the driver 130 for each partial region, and are retained by the driver 130 until the in-frame process completion notification is issued.

In the second modification example of the second embodiment, the driver 130 may count the number of instruction-generating-process end notifications, and may notify the feedback control unit 160 of the counted value. In this case, when the instruction-generating-process end notification is received from the instruction generating unit 110, the library 120 transmits the GPU instructions to the driver 130, and transfers the instruction-generating-process end notification to the driver 130. After the in-frame process completion notification is received, the library 120 transmits the transfer command of the GPU instructions to the driver 130. The driver 130 retains the GPU instructions received from the library 120, and transmits the retained GPU instructions to the GPU 200 after the transfer command of the GPU instructions is received. Even though the instruction-generating-process end notification transferred from the library 120 is received, the driver 130 continues to retain the GPU instructions without transmitting the GPU instructions to the GPU 200. The driver 130 counts the number of received instruction-generating-process end notifications, and notifies the feedback control unit 160 of the counted value.

Figure 30A:
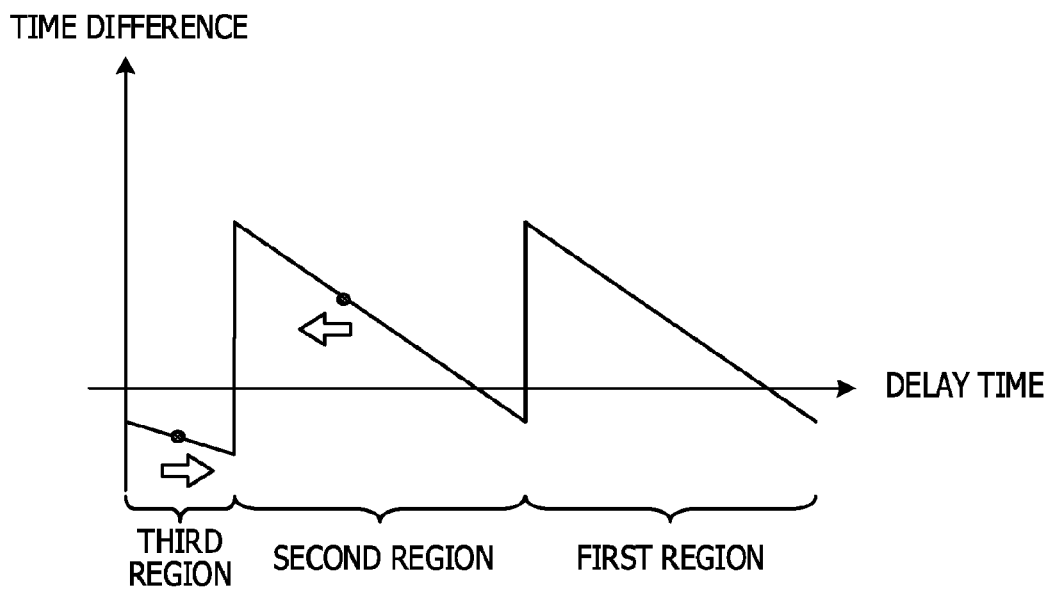
FIGS. 30A and 30B are diagrams for describing an example of a method of setting a delay time according to the second embodiment.

Next, a method of setting the delay time performed by the feedback control unit 160 will be described with reference to FIGS. 30A and 30B. FIG. 30A is a diagram in which a horizontal axis represents a delay time and a vertical axis represents a time difference between the completion notification and the predetermined synchronization signal Vsync. The time difference being a positive value means that the image data generating process is completed in the frame. Meanwhile, the time difference being a negative value means that the image data generating process is not completed in the frame and is completed after the next frame is started. The feedback control unit 160 can recognize the number partial regions in which the image data is generated by the use of the notification from the library 120, and can recognize the time difference between the completion notification and the predetermined synchronization signal Vsync by the use of the notification from the time difference detecting unit 150.

FIG. 30A illustrates that the image data generating process is performed on three partial regions and the time difference is a negative value when the delay time is not set (when the delay time is 0), for example. In such a case, in order to complete the image data generating process in the frame, it is desired to reduce the number of partial regions for which the instruction is generated. Thus, the feedback control unit 160 increases the set of the delay time. When the time difference is a positive value by increasing the set of the delay time, the feedback control unit 160 recognizes that the number of partial regions for which the instruction is generated can be reduced. When the delay time is set to be a predetermined value, and also when the time difference is a positive value, the feedback control unit 160 may reduce the set of the delay time in a range in which the time difference can be maintained at the positive value. Thus, it is possible to increase a time margin between the completion of the image data generating process and the end of the frame.

Figure 30B:
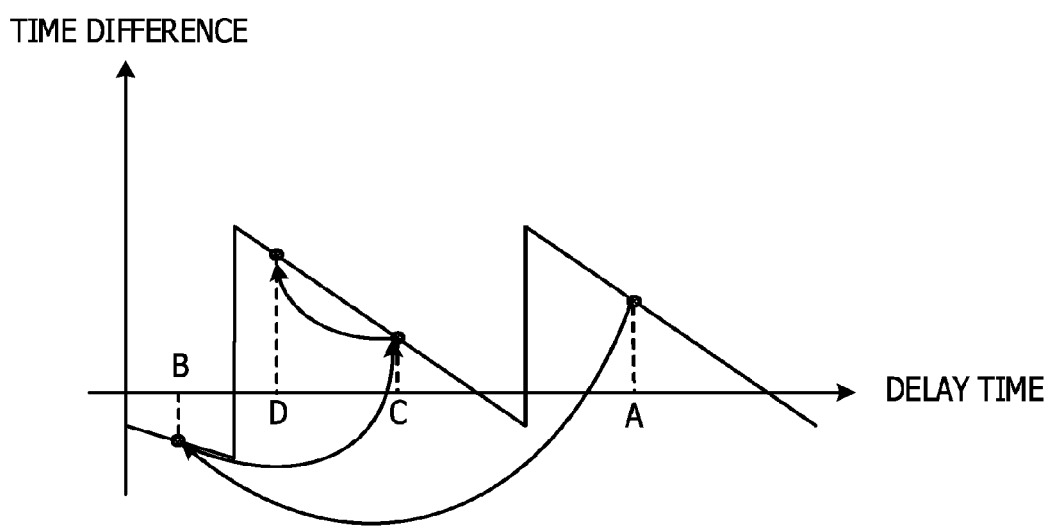

FIG. 30B is a diagram for describing a method of narrowing the delay time. For example, when the delay time is set to an A point, it is possible to increase the number of partial regions in which the image data is generated in the frame by decreasing the delay time. In such a case, the feedback control unit 160 initially reduces the delay time with a first width. Thus, it is assumed that the delay time is set to a B point. When the delay time is set the B point, since the time difference is a negative value, the feedback control unit 160 increases the delay time with a second width smaller than the first width. Thus, it is assumed that the delay time is set a C point. When the delay time is set to the C point, since the time difference is a positive value, the feedback control unit 160 reduces the delay time with a third width smaller than the second width. Thus, the delay time is set to the C point. As stated above, the feedback control unit 160 can set an appropriate delay time a small number of times the delay time is changed by narrowing the delay time while controlling a variation width of the delay time.

As discussed above, the second embodiment and the modification examples thereof have been described. It has been described in the second embodiment and the modification examples thereof that the library 120 or the driver 130 counts the number of partial regions on which the instruction generating process is performed, and notifies the feedback control unit 160 of the counted number, and the feedback control unit 160 sets the delay time based on the number of partial regions and the time difference signal. However, the number of partial regions on which the instruction generating process is performed may not be counted, and in this case, the feedback control unit 160 may set the delay time based on the time difference signal.

Third Embodiment

In the second embodiment, the method of suppressing the number of partial regions for which the instruction is generated in the frame by adjusting the start timing of the instruction generating process performed by the instruction generating unit 110 has been described. In the third embodiment, a method of suppressing the number of partial regions for which the instruction is generated in the frame by controlling the time from the end of the instruction generating process on one partial region to the start of the instruction generating process on another partial region will be described.

Figure 31:
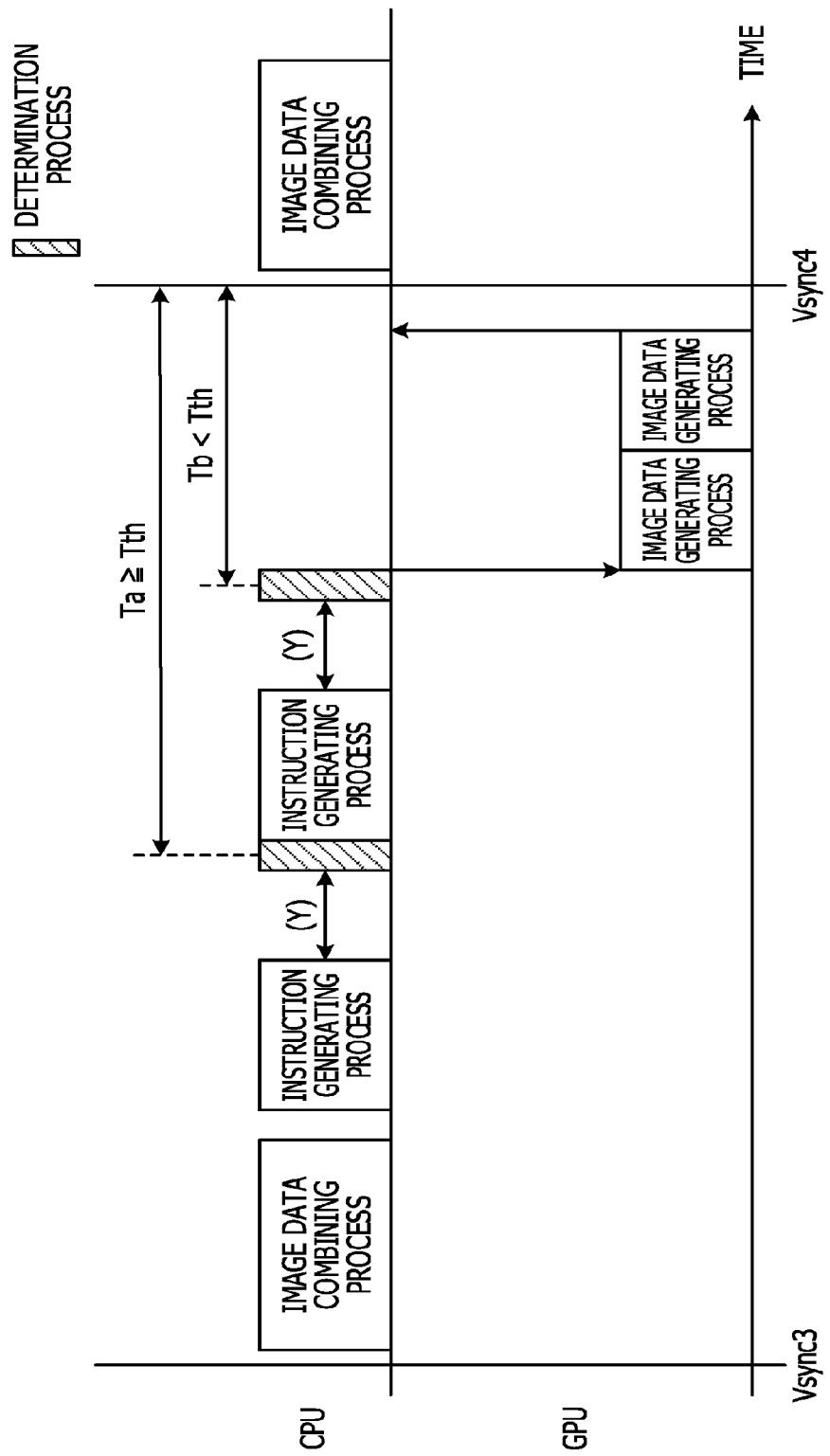
FIG. 31 is a diagram illustrating an example of a timing chart of processes of a CPU and a GPU according to a third embodiment.

Initially, the process timings of the CPU 100 and the GPU 200 according to the third embodiment will be described with reference to FIG. 24 and FIG. 31 referred to in the description of the second embodiment. Similarly to the second embodiment, in the third embodiment, when the instruction generating process on one partial region is ended, the CPU 100 performs a determination process that determines whether or not to additionally perform the instruction generating process on another partial region based on the remaining time of the frame, as illustrated in FIG. 24. In FIG. 24, in the determination process at a time when the instruction generating process on the third partial region is ended, when it is determined that the remaining time Tc of the frame is shorter than the predetermined time Tth, the CPU 100 transmits the GPU instructions generated for three partial regions to the GPU 200. The GPU 200 that receives the GPU instructions generates the image data items regarding the three partial regions. When the image data generating process on the three partial regions is not completed in the frame, in order to suppress the number of partial regions in which the image data is generated in the next frame, the CPU 100 delays the start timing of the instruction generating process on the next partial region after the instruction generating process on one partial region is ended. Specifically, as illustrated in FIG. 31, after the instruction generating process on one partial region is ended, the CPU 100 waits that a predetermined time elapses, and performs a determination process that determines whether or not to additionally perform the instruction generating process on another partial region based on the remaining time of the frame. Through such an operation, it is possible to forcibly reduce the remaining time of the frame when the determination process is performed. In FIG. 31, in the determination process performed after the instruction generating process on two partial regions is ended, the remaining time Tb of the frame is shorter than the predetermined time Tth, and the instruction generating process is not additionally performed. The GPU 200 performs the image data generating process on the two partial regions. In the third embodiment, the number of partial regions on which the instruction generating process is performed in the frame is suppressed by controlling the time until the determination of whether or not to additionally perform the instruction generating process on another partial region after the instruction generating process on one partial region is ended.

In the second embodiment, the hardware configuration of the display apparatus 1 illustrated in the first embodiment may also be applied. The definition of the terms (names) described in the first embodiment and the second embodiment is applied to in the third embodiment unless the context clearly indicates otherwise.

Figure 32:
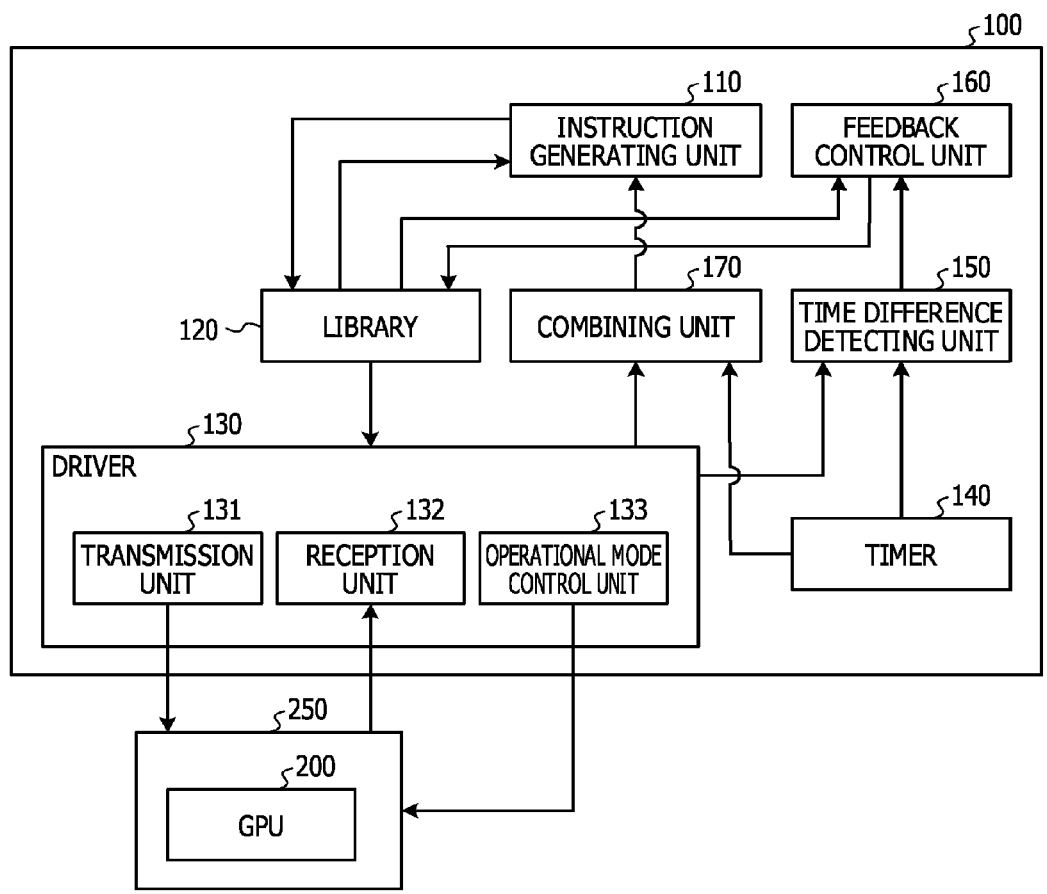
FIG. 32 is a functional block diagram of the CPU according to the third embodiment.

FIG. 32 is a functional block diagram of a CPU 100 according to the third embodiment. The CPU 100 realizes the respective functions illustrated in FIG. 32 by executing a predetermined computer program stored in a memory 400 or another storage device that can be accessed by the CPU 100. Similarly to the first embodiment and the second embodiment, the CPU 100 functions as an instruction generating unit 110, a library 120, a driver 130, a timer 140, a time difference detecting unit 150, a feedback control unit 160, and a combining unit 170. Here, the differences from the first embodiment or the second embodiment will be described.

The instruction generating unit 110 receives the start command of the instruction generating process from the combining unit 170. The instruction generating unit 110 generates the instructions regarding the partial regions based on the received start command, and transmits the generated instructions to the library 120. The instruction generating unit 110 performs a determination process that determines whether or not to additionally perform the instruction generating process on another partial region within the remaining time of the frame whenever the instruction generating process on the partial regions is ended. When it is determined not to additionally perform the instruction generating process on another partial region, the instruction generating unit 110 transmits an in-frame end notification indicating that all the processes are ended in the frame to the library 120.

The library 120 generates the GPU instructions based on the instructions received from the instruction generating unit 110, and transmits the generated GPU instructions to the driver 130. The library 120 counts the number of instruction-generating-process end notifications received from the instruction generating unit 110, and notifies the feedback control unit 160 of the counted value as information indicating the number of partial regions for which the instruction is generated in the frame. The feedback control unit 160 determines the delay time based on the time difference signal transmitted from the time difference detecting unit 150 and the information indicating the number of partial regions transmitted from the library 120, and notifies the library 120 of the determined delay time. The library 120 receives the instruction regarding one partial region from the instruction generating unit 110 in the next frame, and performs the GPU instruction generating process. After the instruction-generating-process end notification on one partial region is received from the instruction generating unit 110, the library 120 transmits a reception notification to the instruction generating unit 110 after a predetermined time elapses based on the delay time transmitted from the feedback control unit 160. After the reception notification is received from the library 120, the instruction generating unit 110 performs a determination process that determines whether or not to additionally perform the instruction generating process on another partial region based on the remaining time of the frame.

In the third embodiment, after the instruction-generating-process end notification is received from the instruction generating unit 110, the library 120 delays the timing of the determination process performed by the instruction generating unit 110 by transmitting the reception notification to the instruction generating unit 110 after the predetermined time elapses. It is possible to forcibly reduce the remaining time of the frame by delaying the timing of the determination process performed by the instruction generating unit 110, and it is possible to suppress the number of partial regions for which the instruction is generated in the frame.

Figure 33:
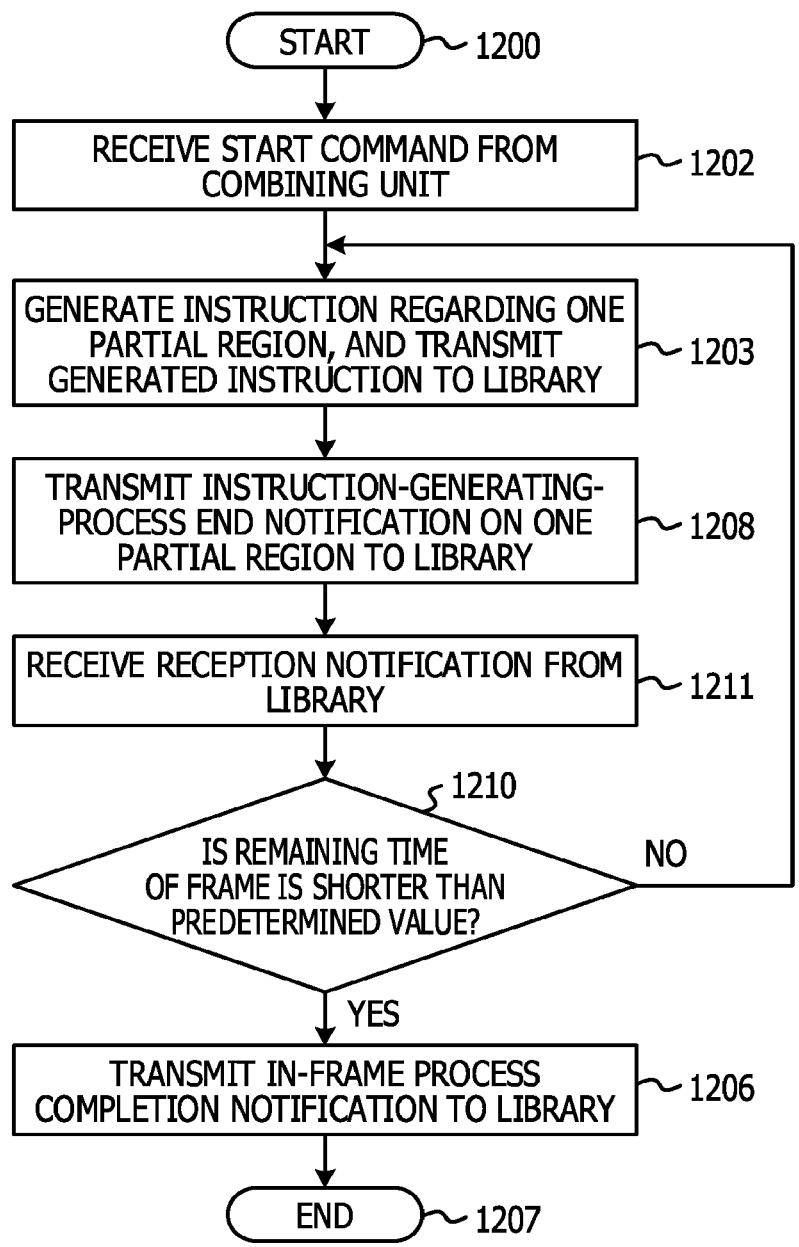
FIG. 33 is a flowchart of a process of an instruction generating unit according to the third embodiment.

FIG. 33 is a flowchart of the instruction generating process of the instruction generating unit 110 according to the third embodiment. The same processes as the processes described in FIG. 12, FIG. 16 or FIG. 27 will be assigned the same reference numerals, and the description thereof will be appropriately omitted or simplified. The flowchart of the processes performed by the driver 130 and the combining unit 170 according to the third embodiment is the same as the flowcharts illustrated in FIG. 14 and FIG. 15.

After the process is started in Process 1200, the instruction generating unit 110 receives the start command of the instruction generating process from the combining unit 170 in Process 1202. In Process 1203, the instruction generating unit 110 generates the instruction regarding one partial region, transmits the generated instruction to the library 120, and transmits the instruction-generating-process end notification on one partial region to the library 120 in Process 1208. In Process 1211, the instruction generating unit 110 receives the reception notification in response to the instruction-generating-process end notification from the library 120. In Process 1210, the instruction generating unit 110 determines whether or not the remaining time of the frame is shorter than the predetermined time based on the reception of the reception notification. In Process 1210, when it is determined that the remaining time of the frame is equal to or longer than the predetermined time, the process returns to Process 1203, and the instruction generating unit additionally generates the instruction regarding another partial region. In Process 1210, when it is determined that the remaining time of the frame is shorter than the predetermined time, the process proceeds to Process 1206, and the instruction generating unit 110 transmits the in-frame process completion notification to the library 120 in Process 1206, and ends the process in Process 1207.

Figure 34:
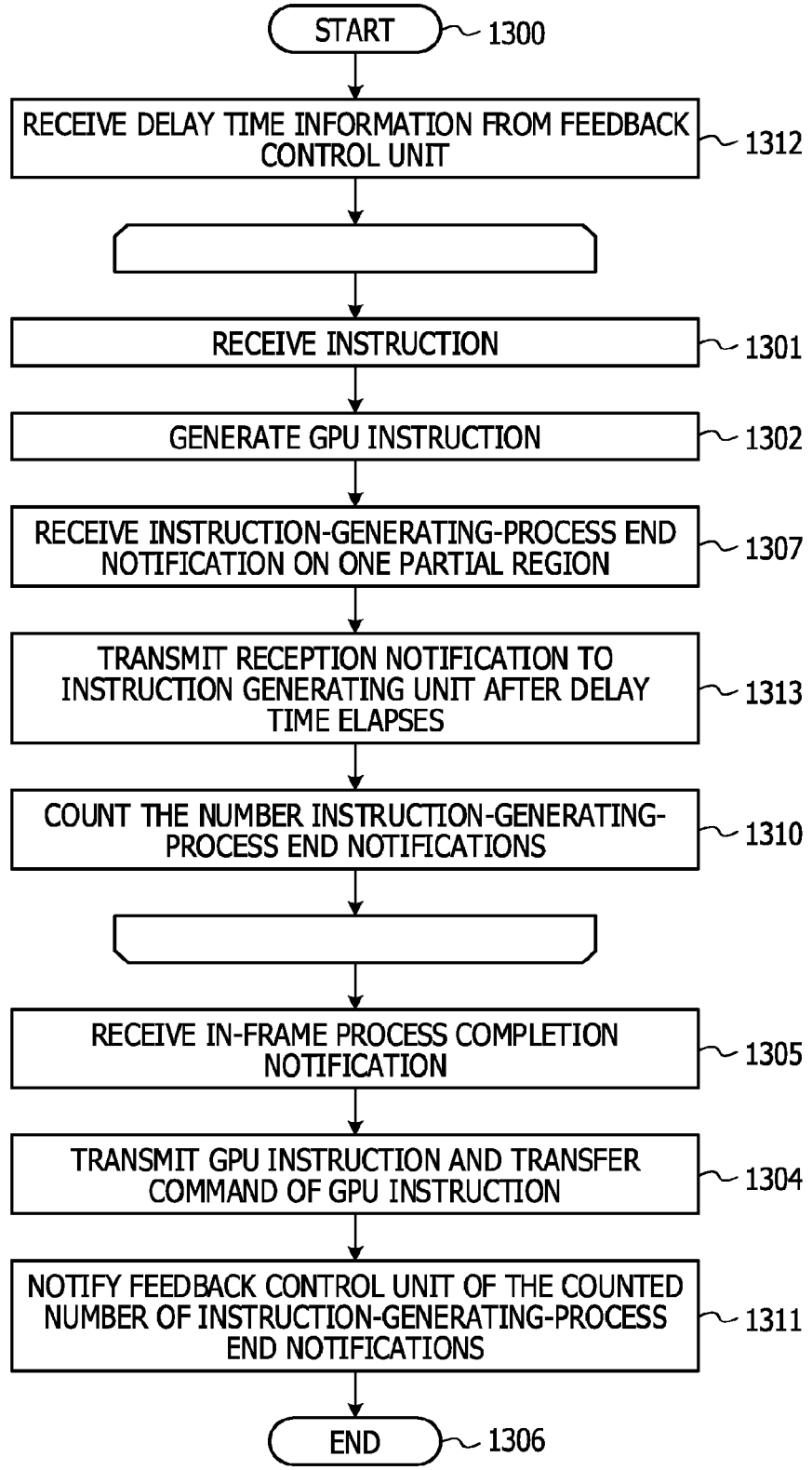
FIG. 34 is a flowchart of a process of a library according to the third embodiment.

FIG. 34 is a flowchart of the GPU instruction generating process of the library 120 according to the third embodiment. The same processes as the processes described in FIG. 13, FIG. 17, FIG. 18 or FIG. 28 will be assigned the same reference numerals, and the description thereof will be appropriately omitted or simplified. After the process is started in process 1300, the library 120 receives delay time information from the feedback control unit 160 in Process 1312. Thereafter, the library 120 receives the instruction from the instruction generating unit 110 in Process 1301, and generates the GPU instruction in Process 1302. The library 120 receives the instruction-generating-process end notification in Process 1306. The library 120 retains the GPU instruction without transmitting the GPU instruction to the driver 130 even though the instruction-generating-process end notification is received in Process 1307. Here, in Process 1313, the library 120 transmits a reception notification indicating that the instruction-generating-process end notification is received to the instruction generating unit 110 when a predetermined time elapses after the instruction-generating-process end notification is received based on the delay time information received from the feedback control unit 160. Since the instruction generating unit 110 waits for the reception of this reception notification and performs the determination process of Process 1210 described in FIG. 33, the library 120 transmits the reception notification after a predetermined time elapses and in Process 1313, and thus, it is possible to forcibly perform the determination process performed by the instruction generating unit 110. Accordingly, it is possible to restrict the number of partial regions on which the instruction generating process is performed in the frame.

Referring back to FIG. 34, the library 120 counts the number of instruction-generating-process end notifications received in Process 1306 in Process 1310. Process 1301, Process 1302, Process 1307, Process 1313 and Process 1310 form a loop, and are repeatedly performed until the in-frame process completion notification is received from the instruction generating unit 110. When the in-frame process completion notification is received in Process 1305, the library 120 transmits the GPU instructions and the transfer command of the GPU instructions to the driver 130 in Process 1304. Thereafter, in Process 1311, the library 120 notifies the feedback control unit 160 of the counted number of instruction-generating-process end notifications, that is, the number of partial regions on which the instruction generating process is performed in the frame, and ends the process in Process 1306.

Figure 35:
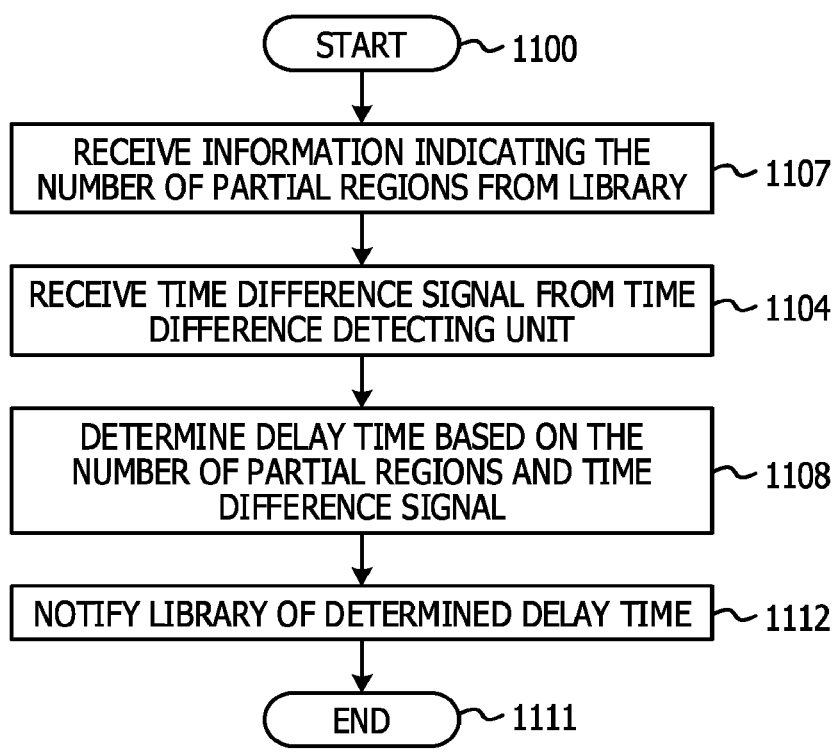
FIG. 35 is a flowchart of a process of a feedback control unit according to the third embodiment.

FIG. 35 is a flowchart of a process of setting the delay time of the feedback control unit 160 according to the third embodiment. The same processes as the processes described in FIG. 11 or FIG. 29 will be assigned the same reference numerals, and the description thereof will be appropriately omitted or simplified. The process performed by the feedback control unit 160 is started from Process 1100. In Process 1107, the feedback control unit 160 receives information indicating the number of partial regions for which the instruction is generated from the library 120. After the time difference signal is received from the time difference detecting unit 150 in Process 1104, the feedback control unit 160 determines the delay time based on the time difference signal and the number of partial regions for which the instruction is generated in Process 1108. In Process 1112, the feedback control unit 160 notifies the library 120 of the determined delay time, and ends the process in Process 1111.

In the third embodiment, the library 120 determines the delay time until the reception notification is replied after the instruction-generating-process end notification is received from the instruction generating unit 110 based on the time difference signal and the number of partial regions for which the instruction is generated in the previous frame. Accordingly, it is possible to control the time until the determination process is performed after the instruction generating process on one partial region is ended. As a result, it is possible to suppress the number of partial regions for which the instruction is generated in the frame, and it is possible to increase the possibility that the image data generating process will be completed in the frame.

As discussed above, the third embodiment has been described. In the third embodiment, the library 120 counts the number of partial regions for which the instruction is generated in the frame by counting the number of instruction-generating-process end notifications, and notifies the feedback control unit 160 of the counted number. As a modification example of the third embodiment, the driver 130 may count the number of instruction-generating-process end notifications, and may notify the feedback control unit 160 of the counted value. Specifically, as described as the first modification example of the second embodiment, the library 120 transfers the instruction-generating-process end notification to the driver 130 in place of Process 1310 after Process 1306 in FIG. 28. The driver 130 counts the number of instruction-generating-process end notifications transferred from the library 120. Thereafter, the driver 130 notifies the feedback control unit 160 of the counted number of instruction-generating-process end notifications based on the fact that the GPU instructions and the transfer command of the GPU instructions are received from the library 120.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus that generates image data regarding an image region including a plurality of partial regions based on synchronization signals generated at a predetermined time interval, the apparatus comprising:
   a memory;
   a first processor coupled to the memory; and
   a second processor coupled to the first processor, wherein
   the first processor is configured to generate a first instruction, based on a first synchronization signal, the first instruction instructing that first partial image data regarding N (N is a natural number) partial regions of the plurality of partial regions are to be generated,
   the second processor is configured to generate the first partial image data based on the first instruction,
   the first processor is configured to determine a natural number M based on a time when the generation of the first partial image data is completed and a time when a second synchronization signal which is subsequently issued to the first synchronization signal is generated, and is configured to generate, based on the second synchronization signal, a second instruction instructing that second image data regarding M partial regions of the plurality of partial regions are to be generated, and the second processor is configured to generate the second partial image data based on the second instruction.

2. The apparatus according to claim 1, wherein the first processor is configured to
   generate first partial instructions regarding the N partial regions,
   accumulate the generated first partial instructions, and
   transmit the first instruction including the first partial instructions to the second processor after the first partial instructions regarding all the N partial regions are accumulated.

3. The apparatus according to claim 1, wherein the first processor is configured
   to generate first image data regarding the image region based on the second synchronization signal when the generation of the first partial image data is completed earlier than the time when the second synchronization signal is issued, and
   not to generate the first image data for a period of time until a third synchronization signal which is subsequently issued to the second synchronization signal is received when the generation of the first partial image data is completed later than the time when the second synchronization signal is issued.

4. The apparatus according to claim 3, wherein the generation of the second instruction is started after the first image data is generated.

5. The apparatus according to claim 1, wherein the first processor is configured to specify the M as a natural number less than the N when the generation of the first partial image data is completed later than the time when the second synchronization signal is issued.

6. The apparatus according to claim 1, wherein the first processor is configured to calculate a time difference between the time when the generation of the first partial image data is completed and the time when the second synchronization signal is issued, and is configured to specify the M based on the calculated time difference and the N.

7. The apparatus according to claim 1, wherein each of the plurality of partial regions is a minimum unit region for which the first processor instructs the second processor to generate the image data,
   the first instruction and the second instruction are generated based on executing of a computer program by the first processor, and
   a size of the unit region is specified based on executing of a computer program by the first processor.

8. The apparatus according to claim 1, wherein the second processor is configured to be controlled in a first operational mode before the generation of the first partial image data is performed, and is configured to be controlled in a second operational mode of which power consumption is higher than that of the first operation mode when the generation of the first partial image data is performed.

9. An apparatus that generates image data regarding an image region including a plurality of partial regions based on a synchronization signal generated at a predetermined time interval, the apparatus comprising:
   a memory;
   a first processor coupled to the memory; and
   a second processor coupled to the first processor, wherein
   the first processor is configured to generate, based on a first synchronization signal, first partial instructions instructing that image data regarding N (N is a natural number) partial regions of the plurality of partial regions are to be generated, and is configured to transmit a first instruction including the N first partial instructions to the second processor after the first partial instructions regarding the N partial regions are generated, the second processor is configured to generate first partial image data regarding the N partial regions based on the first instruction, the first processor is configured to generate, based on a second synchronization signal which is subsequently issued to the first synchronization signal, second partial instructions instructing that image data regarding M (M is a natural number) partial regions of the plurality of partial regions are to be generated, and is configured to transmit a second instruction including the M second partial instructions to the second processor after the second partial instructions regarding the M partial regions are generated, the second processor is configured to generates second partial image data regarding the M partial regions based on the second instruction, and the first processor is configured to delay the start of a process of generating any one of the M second partial instructions based on a time when the generation of the first partial image data is completed and a time when the second synchronization signal is issued.

10. The apparatus according to claim 9, wherein the first processor is configured to determine whether or not a remaining time until the second synchronization signal is generated is longer than a predetermined time whenever the first partial instructions regarding the N partial regions are generated, to generate the first partial instructions regarding another region of the N partial regions when the remaining time is longer than the predetermined time, and not to generate the first partial instructions regarding another region of the N partial regions when the remaining time is shorter than the predetermined time.

11. The apparatus according to claim 9, wherein the first processor is configured to generate the first partial instructions regarding the N partial regions, accumulate the generated first partial instructions, and transmit the first instruction including the first partial instructions to the second processor after the first partial instructions regarding all the N partial regions are accumulated.

12. The apparatus according to claim 9, wherein the second processor is configured to be controlled in a first operational mode before the generation of the first partial image data is performed, and be controlled in a second operational mode of which power consumption is higher than that of the first operational mode when the generation of the first partial image data is performed.

13. A method of generating image data regarding an image region including a plurality of partial regions based on a synchronization signal generated at a predetermined time interval, the method comprising:

generating, based on a first synchronization signal, a first instruction instructing that first partial image data regarding N (N is a natural number) partial regions of the plurality of partial regions are to be generated;

generating the first partial image data based on the first instruction;

determining a natural number M based on a time when the generation of the first partial image data is completed and a time when a second synchronization signal which is subsequently issued to the first synchronization signal is generated;

generating, based on the second synchronization signal, a second instruction instructing that second partial image data regarding M partial regions of the plurality of partial regions are to be generated; and generating the second partial image data based on the second instruction.

14. The method according to claim 13, wherein the generating of the first instruction, the determining of the M, and the generating of the second instruction are performed by a first processor, and the generating of the first partial image data and the generating of the second partial image data are performed by a second processor.

* * * * *